US012258288B2

(12) United States Patent
Johnson

(10) Patent No.: US 12,258,288 B2
(45) Date of Patent: Mar. 25, 2025

(54) INTEGRATED BIOGAS TREATMENT AND CARBON DIOXIDE BASED DISINFECTION FOR WATER TREATMENT

(71) Applicant: Bryan R. Johnson, Mukwonago, WI (US)

(72) Inventor: Bryan R. Johnson, Mukwonago, WI (US)

(73) Assignee: Energy Tech Innovations, LLC, Mukwonago, WI (US)

( * ) Notice: Subject to any disclaimer, the term of this patent is extended or adjusted under 35 U.S.C. 154(b) by 0 days.

(21) Appl. No.: 18/663,666

(22) Filed: May 14, 2024

(65) Prior Publication Data

US 2024/0294409 A1 Sep. 5, 2024

Related U.S. Application Data

(63) Continuation of application No. 17/198,572, filed on Mar. 11, 2021, now Pat. No. 12,012,344, which is a
(Continued)

(51) Int. Cl.
*C02F 1/66* (2023.01)
*B01D 53/14* (2006.01)
(Continued)

(52) U.S. Cl.
CPC ............ *C02F 1/66* (2013.01); *B01D 53/1475* (2013.01); *B01D 53/1487* (2013.01); *C02F 1/008* (2013.01); *C02F 1/76* (2013.01); *B01D 2252/103* (2013.01); *C02F 2209/06* (2013.01); *C02F 2209/40* (2013.01); *C02F 2303/04* (2013.01)

(58) Field of Classification Search
CPC ............ B01D 53/1475; B01D 53/1487; B01D 2252/103; C02F 1/66; C02F 1/008;
(Continued)

(56) References Cited

U.S. PATENT DOCUMENTS

| 4,670,157 A | 6/1987 | Nicksic |
| 5,965,004 A | 10/1999 | Cowley et al. |

(Continued)

FOREIGN PATENT DOCUMENTS

| CN | 101559348 A | 10/2009 |
| CN | 104649473 A | 5/2015 |

(Continued)

OTHER PUBLICATIONS

Wesley, "A Review of Biogas Utilisation, Purification and Upgrading Technologies"; Mar. 2017.

*Primary Examiner* — Christopher P Jones
*Assistant Examiner* — Phillip Y Shao
(74) *Attorney, Agent, or Firm* — Boyle Fredrickson, S.C.

(57) ABSTRACT

A biogas treatment process is integrated with a water treatment process to adjust the pH level of the water and to provide more effective disinfection of the water. A water wash process is utilized to separate methane and carbon dioxide present in the biogas. During the water wash process, the biogas is mixed with water and the carbon dioxide is absorbed into the water. Because the process typically occurs at an elevated pressure and reduced temperature to enhance the solubility of carbon dioxide in water, the water stream becomes supersaturated with carbon dioxide. This water stream, which is supersaturated with carbon dioxide, is provided to the water treatment process to adjust the pH level of the water treatment process. The pH level is regulated to a desired level such that an increased relative concentration of hypochlorous acid is produced when sodium hypochlorite is added to the treatment process.

17 Claims, 19 Drawing Sheets

Related U.S. Application Data continuation-in-part of application No. 16/725,426, filed on Dec. 23, 2019, now Pat. No. 11,268,063, which is a continuation-in-part of application No. 15/248,510, filed on Aug. 26, 2016, now Pat. No. 10,518,209.

(60) Provisional application No. 62/211,494, filed on Aug. 28, 2015.

(51) Int. Cl.
*C02F 1/00* (2023.01)
*C02F 1/76* (2023.01)

(58) Field of Classification Search
CPC .... C02F 1/76; C02F 2209/06; C02F 2209/40; C02F 2303/04
See application file for complete search history.

(56) References Cited

U.S. PATENT DOCUMENTS

| | | | |
|---|---|---|---|
| 6,096,221 A | 8/2000 | Kerchouche et al. | |
| 9,073,002 B2 * | 7/2015 | Raatschen | B01D 53/04 |
| 2001/0052503 A1 | 12/2001 | Delonge et al. | |
| 2005/0242027 A1 | 11/2005 | Tokutomi et al. | |
| 2006/0027463 A1 | 2/2006 | Lavelle et al. | |
| 2006/0169646 A1 | 8/2006 | Andree et al. | |
| 2008/0006587 A1 | 1/2008 | Cumming et al. | |
| 2010/0163399 A1 | 7/2010 | Ishihara et al. | |
| 2012/0009668 A1 | 1/2012 | Hass | |
| 2012/0085690 A1 | 4/2012 | Hass | |
| 2013/0313199 A1 | 11/2013 | Marcin et al. | |
| 2014/0069821 A1 | 3/2014 | Marcin et al. | |
| 2014/0314657 A1 | 10/2014 | Zhao et al. | |
| 2016/0122210 A1 | 5/2016 | Cosac | |
| 2016/0259348 A1 | 9/2016 | Lewis et al. | |
| 2016/0299096 A1 | 10/2016 | Greenwood et al. | |
| 2020/0339447 A1 | 10/2020 | Amendt | |
| 2020/0369534 A1 | 11/2020 | Kleiber | |
| 2020/0385299 A1 | 12/2020 | Ganzi et al. | |
| 2021/0147256 A1 | 5/2021 | Schoenheit et al. | |

FOREIGN PATENT DOCUMENTS

| | | |
|---|---|---|
| CN | 216472405 U | 5/2022 |
| JP | 2008161782 A | 7/2008 |
| JP | 4522534 B2 | 8/2010 |
| JP | 5202253 B2 | 6/2013 |
| KR | 20030078657 A | 10/2003 |

* cited by examiner

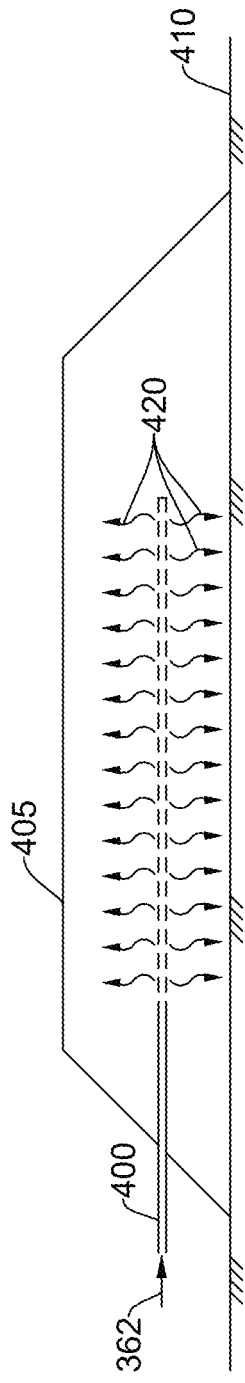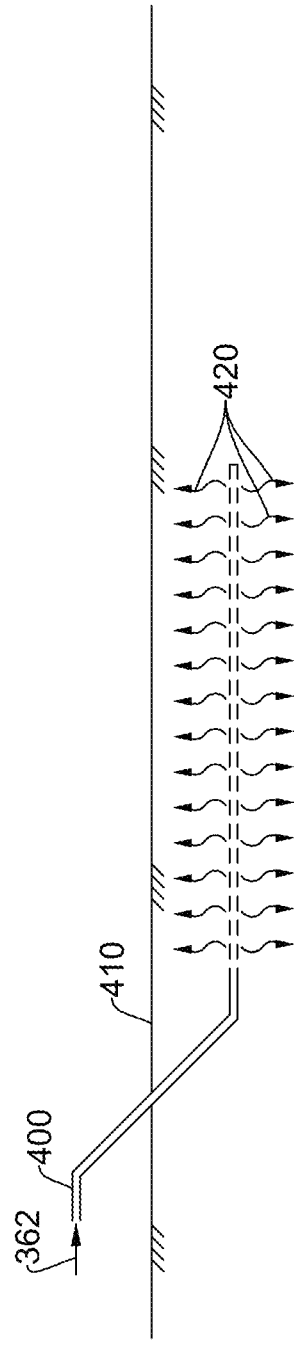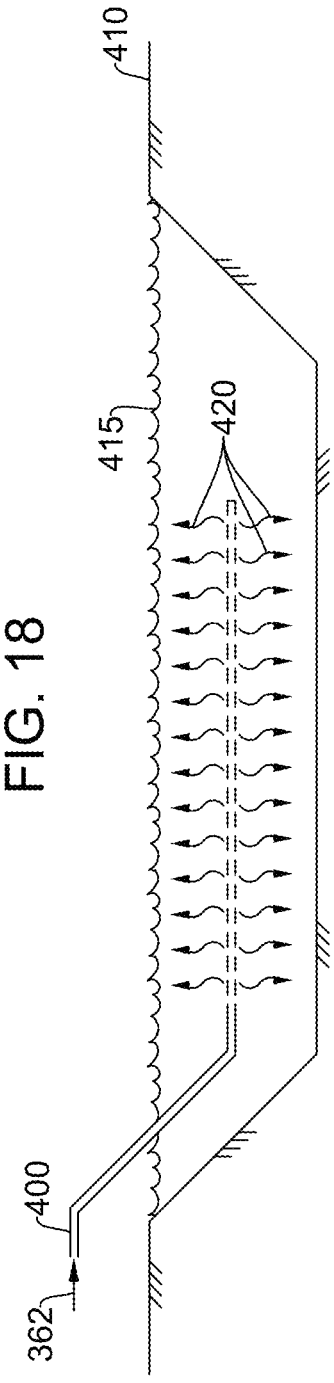

INTEGRATED BIOGAS TREATMENT AND CARBON DIOXIDE BASED DISINFECTION FOR WATER TREATMENT

CROSS-REFERENCE TO RELATED APPLICATIONS

This application is a continuation of, and claims priority to, U.S. Ser. No. 17/198,572, filed on Mar. 11, 2021; which, in turn, is a continuation-in-part of, and claims priority to, U.S. Ser. No. 16/725,426, filed Dec. 23, 2019, which issued as U.S. Pat. No. 11,268,063 on Mar. 8, 2022; which, in turn, is a continuation-in-part of, and claims priority to, U.S. Ser. No. 15/248,510, filed Aug. 26, 2016, which issued as U.S. Pat. No. 10,518,209 on Dec. 31, 2019; and which, in turn, claims priority to U.S. provisional application Ser. No. 62/211,494, filed Aug. 28, 2015, the entire contents of each application is incorporated herein by reference.

BACKGROUND OF THE INVENTION

The subject matter disclosed herein relates to a system for use in a chlorine-based disinfection process for water treatment and, more specifically, for a system to perform a separation process on biogas by which carbon dioxide is separated from methane in the biogas and the carbon dioxide is subsequently used to adjust the pH in a water treatment process thereby improving disinfection of the water by the chlorine.

A typical water treatment process includes multiple steps, including, for example, sedimentation, biological, and filtration processes. These initial steps are designed to remove higher levels of impurities, such as organics and suspended solids, from water to be treated. After the initial steps of removing impurities to targeted levels a final disinfection step is typically performed to kill or inactivate microscopic pathogens, such as bacteria, parasites, or viruses to reach desired discharge treatment levels. Disinfection is commonly performed as the final water treatment step by the addition of one or more chemicals to the water before it is discharged from a water treatment facility.

One common chemical used for disinfection is chlorine and a common method of introducing the chlorine to the water for treatment is by adding sodium hypochlorite (NaClO) to the water. When the sodium hypochlorite is added to the water, the compound dissolves, releasing chlorine in two different forms, namely hypochlorous acid (HOCl) and hypochlorite ions (OCl$^-$). Although, both hypochlorous acid and hypochlorite ions act to disinfect the water, the hypochlorous acid is more effective at disinfection than hypochlorite ions.

It is known that the concentration of hypochlorous acid and hypochlorite released into the water as the sodium hypochlorite dissolves is a function of the pH level of the water. As the pH level of the water being treated increases, the concentration of hypochlorous acid decreases and the concentration of hypochlorite increases. Conversely, as the pH level of the water being treated decreases, the concentration of hypochlorous acid increases and the concentration of hypochlorite decreases.

Thus, it would be desirable to regulate the water treatment process to maintain a pH level resulting in a greater concentration of hypochlorous acid than hypochlorite is generated when sodium hypochlorite is added to the treatment process.

Historically, there have been a number of acidic chemicals utilized to lower the pH level of wastewater. Two such acidic chemicals include sulfuric acid and hydrochloric acid. Sulfuric acid and hydrochloric acid are very potent acids, highly corrosive, and are prone to generating poisonous fumes. Particular care must be exercised when handling and using these strong acids. Alternately, carbon dioxide in its gaseous form is typically used where commercially available. Carbon dioxide is a weaker acid when mixed with water, forming carbonic acid. When available, carbon dioxide provides an option for pH reduction with reduced concerns for corrosion and poisonous fumes. However, carbon dioxide does have the ability to displace air in confined spaces and can become lethal due to the displacement of oxygen if allowed to accumulate in a confined space.

However, any of the above-mentioned acids must be transported by truck to and stored at the water treatment site, requiring a substantial investment in additional equipment and infrastructure. When carbon dioxide is available and in use, specialized vessels are required to store the carbon dioxide under pressure and to introduce the carbon dioxide into the water treatment process. Further, care must be taken to avoid accumulation of carbon dioxide in a confined space. If any of these acidic chemicals are commercially supplied for a water treatment process to lower the pH, there is considerable expense associated with the cost of the chemical, storage infrastructure, and additional training of personnel to handle, monitor, and use these chemicals.

Thus, it would be desirable to provide a system to regulate or reduce the pH level of water being treated without requiring the costs for purchasing the chemical, for the storage infrastructure, or for training personnel in handling of these acidic chemicals.

BRIEF DESCRIPTION OF THE INVENTION

The subject matter disclosed herein describes a system and method to adjust the pH level of a water treatment process resulting in a more efficient disinfection process. Additionally, the system and method adjusts the PH level of the water treatment process without requiring the dedicated storage and handling of acidic chemicals. The water treatment process is integrated with a biogas treatment process, where the biogas treatment process provides a supply of carbon dioxide to the water treatment process. Biogas is produced from anaerobic digestion and contains primarily methane and carbon dioxide with lesser quantities of other constituents. Methane may be present in an amount ranging from fifty to sixty-five percent (50-65%) by volume, carbon dioxide may be present in an amount ranging from thirty-five to fifty percent (35-50%) by volume. Several processes exist by which the carbon dioxide and methane can be separated including, for example, a water wash process, chemical absorption, pressure swing absorption, and membrane separation.

According to one embodiment of the invention, a water wash process is utilized to separate the methane and carbon dioxide. Biogas is injected into water relying on the fact that carbon dioxide is many times more soluble in water than methane. During the water wash process, the biogas is mixed with water and the carbon dioxide is absorbed into the water. The process typically occurs at an elevated pressure and the temperature may be reduced to enhance the solubility of carbon dioxide in water. With the process performed under an elevated pressure, the water stream becomes supersaturated with carbon dioxide, allowing the water stream to carry several times the amount of absorbed carbon dioxide in comparison to water at atmospheric pressure. This water stream, which is supersaturated with carbon dioxide, may be provided to the water treatment process to regulate the pH level of the water treatment process. When the pH level is regulated to a lower target level, typically for a pH level less than 7.5, then a greater concentration of hypochlorous acid than hypochlorite is generated when sodium hypochlorite is added to the disinfection treatment process. The greater concentration of hypochlorous acid versus hypochlorite is desirable as hypochlorous acid provides a substantially higher disinfection capability than hypochlorite.

According to one embodiment of the invention, an apparatus for regulating a pH level in a water treatment system includes, a biogas treatment process configured to receive a biogas as an input and to output a carbon dioxide stream, a sensor configured to generate a signal corresponding the pH level in the water treatment system, and a controller configured to receive the signal from the sensor and to control injection of the carbon dioxide stream into the water treatment system as a function of the signal.

According to other aspects of the invention, the controller may be configured to control injection of the carbon dioxide stream by regulating a flow rate of the carbon dioxide stream into a basin of water to be treated. Optionally, the apparatus may include multiple injection devices located at different depths within a basin of water to be treated, and the controller is configured to control each of the plurality of injection devices to control injection of the carbon dioxide stream. According to still another option, the apparatus may include a carbon dioxide aeration valve, and the controller is configured to control the carbon dioxide aeration valve to adjust a level of carbon dioxide present in the carbon dioxide stream.

According to still other aspects of the invention, the biogas treatment process also receives a water stream as an input and the carbon dioxide stream is a carbon dioxide water stream. The apparatus may include a first and a second basin. The first basin includes secondary treated wastewater, and the second basin is configured to disinfect the secondary treated wastewater. A first portion of the secondary treated wastewater is the water stream input to the biogas treatment process, a second portion of the secondary treated wastewater is provided as a first input to the second basin, and the carbon dioxide water stream is provided as a second input to the second basin.

According to yet other aspects of the invention, a chlorine compound is provided as a third input to the second basin. The sensor is configured to generate a signal corresponding to a pH level of the second portion of the secondary treated wastewater entering the second basin, and the controller is configured to regulate the pH level in the second basin such that the chlorine compound generates a greater concentration of hypochlorous acid than hypochlorite when the chlorine compound is provided to the second basin.

According to another embodiment of the invention, a method for regulating a pH level in a water treatment system is disclosed. A biogas containing carbon dioxide is treated, generating a carbon dioxide stream. A sensor, operatively connected to the water treatment system, generates a feedback signal corresponding to the pH level, and injection of the carbon dioxide stream into the water treatment system is controlled with a controller as a function of the measured pH level.

According to still another embodiment of the invention, a system for regulating a pH level in a water treatment process includes a first basin configured to hold secondary treated wastewater, and a biogas treatment process configured to receive a biogas and a first portion of the secondary treated wastewater as inputs and configured to generate a carbon dioxide water stream as an output. A second basin is configured to disinfect the secondary treated wastewater, where the second basin is configured to receive a second portion of the secondary treated wastewater and the carbon dioxide water stream as inputs. A sensor is configured to generate a signal corresponding to a pH level of the secondary treated wastewater, and a controller is configured to receive the signal from the sensor and to control delivery of the carbon dioxide water stream to the second basin.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWING(S)

Various exemplary embodiments of the subject matter disclosed herein are illustrated in the accompanying drawings in which like reference numerals represent like parts throughout, and in which:

FIG. 17 is a side elevation view of one embodiment of a discharge pipe for releasing carbon dioxide removed from the biogas stream;

FIG. 18 is a side elevation view of another embodiment of a discharge pipe for releasing carbon dioxide removed from the biogas stream;

FIG. 19 is a side elevation view of another embodiment of a discharge pipe for releasing carbon dioxide removed from the biogas stream;

Figure 1:
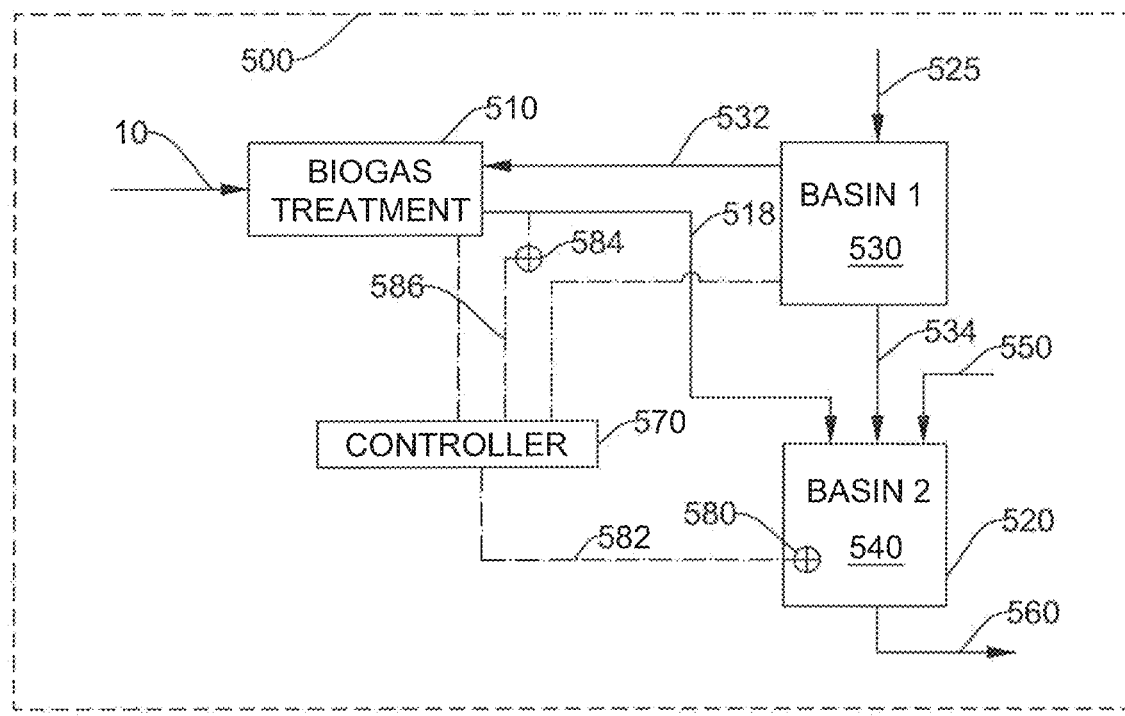
FIG. 1 is a block diagram representation of one embodiment of a water treatment system with integrated biogas treatment and carbon dioxide enhanced disinfection.

In describing the preferred embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

The various features and advantageous details of the subject matter disclosed herein are explained more fully with reference to the non-limiting embodiments described in detail in the following description.

Turning initially to FIG. 1, one embodiment of a water treatment system 500 with integrated biogas treatment 510 and chlorine disinfection 520 is illustrated. Initial steps in the water treatment system 500 may include, for example, sedimentation, biological, and filtration processes. Still other steps may be included, but are not shown for ease of illustration. A flow of secondary treated wastewater 525 is received at a first basin 530. Optionally, the secondary treated wastewater 525 may result from some or all of the initial steps discussed above being performed in the first basin on water to be treated. A first portion 532 of the secondary treated wastewater 525 is provided to the biogas treatment process 510, and a second portion 534 of the secondary treated wastewater 525 is provided to the chlorine disinfection process 520 which is illustrated as occurring in a second basin 540.

Figure 2:
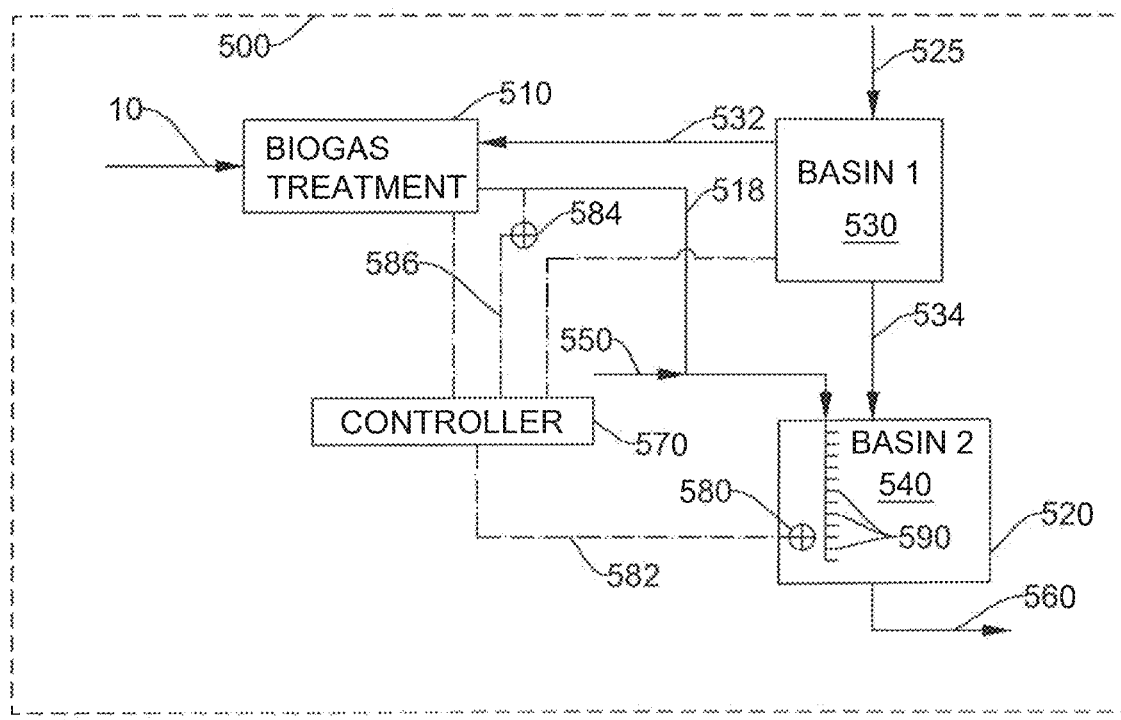
FIG. 2 is a block diagram representation of another embodiment of a water treatment system with integrated biogas treatment and carbon dioxide enhanced disinfection.
Figure 3:
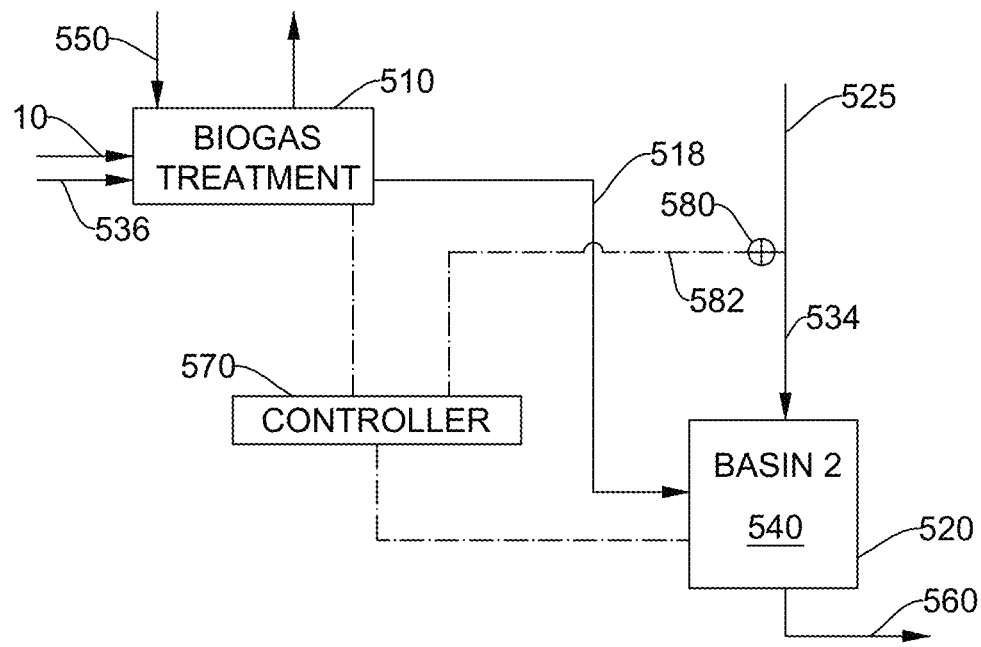
FIG. 3 is a block diagram representation of another embodiment of a water treatment system with integrated biogas treatment and carbon dioxide enhanced disinfection.
Figure 4:
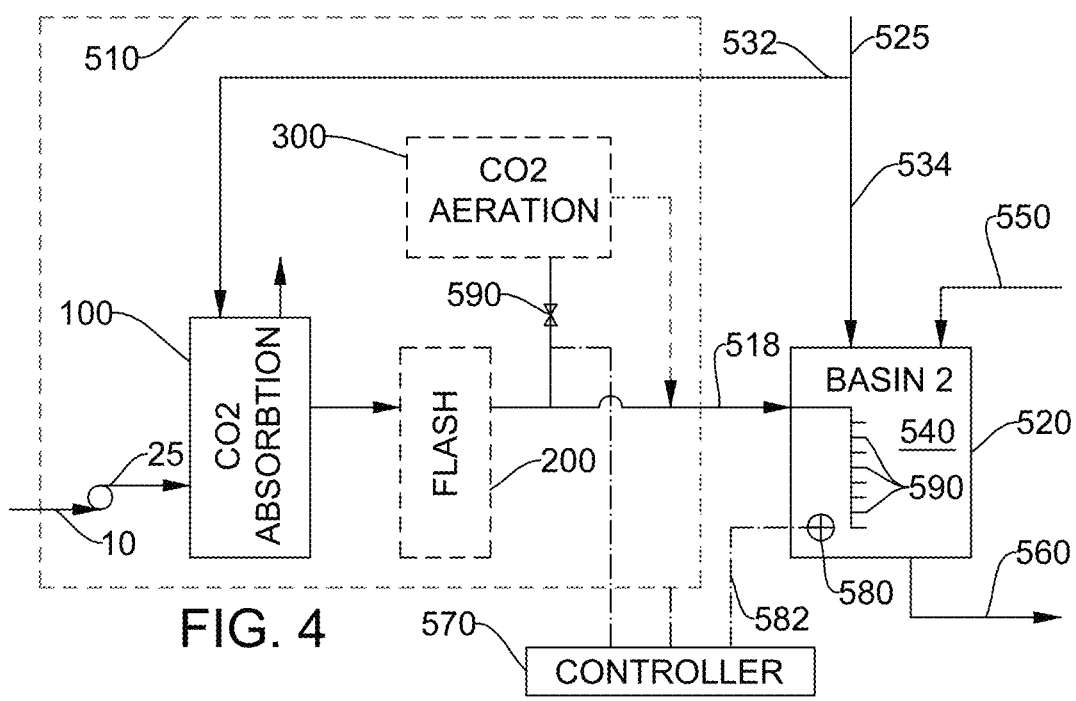
FIG. 4 is a block diagram representation of another embodiment of a water treatment system with integrated biogas treatment and carbon dioxide enhanced disinfection.

With reference also to FIGS. 2-4, it is contemplated that the present invention may be integrated into various configurations of water treatment systems. In FIG. 2, the secondary treated wastewater 525 is again supplied to or produced within the first basin 530. A first portion 532 of the secondary treated wastewater is supplied to the biogas treatment process 510 and a second portion 534 of the secondary treated wastewater is provided to the second basin 540 for chlorine disinfection. In FIGS. 3 and 4, it is contemplated that the first basin may be a prior basin or other reservoir in the wastewater treatment process and the first basin is not expressly shown. Rather the secondary treated wastewater 525 is supplied from the earlier steps in the water treatment system 500 which are not shown and provided to the illustrated portions of the water treatment system. In FIG. 3, it is contemplated that the entire supply of secondary treated wastewater 525 may be provided as the second portion 534 to the second basin 540. A secondary supply of water 536 is provided to the biogas treatment process 510 rather than diverting a first portion 532 from the secondary treated wastewater 525. In FIG. 4, again there is no explicitly illustrated basin for the secondary treated wastewater 525, however, the secondary treated wastewater 525 supply is again divided into a first portion 532 supplied to the biogas treatment process 510 and a second portion 534 supplied to the chlorine disinfection process. Because the output of the biogas treatment process is a carbon dioxide water stream 518, as discussed in more detail below, where the carbon dioxide water stream 518 includes water from either the first portion 532 of the secondary treated wastewater 525 or from the secondary supply of water 536 and carbon dioxide dissolved into that water, the first portion 532 of secondary treated wastewater 525 that is initially diverted through the biogas treatment 510 will still be disinfected in the chlorine disinfection process 520 when the carbon dioxide water stream 518 enters the second basin 540. Although discussed above, secondary treated wastewater 525 in this description is not intended to be limiting. It is understood that the secondary treated wastewater 525 may be any water having a high pH value which requires a reduction in the pH level via the regulation process described in more detail below.

Although FIGS. 1-4 illustrate different embodiments of a water treatment system 500 integrating biogas treatment 510 and chloring disinfection 520, these embodiments are intended to be illustrative and not exhaustive of different configurations of water treatment systems 500. It is contemplated that different arrangements of water treatment systems 500 may be utilized and the features shown in the illustrated embodiments may be arranged in different combinations without deviating from the scope of the invention.

Figure 5:
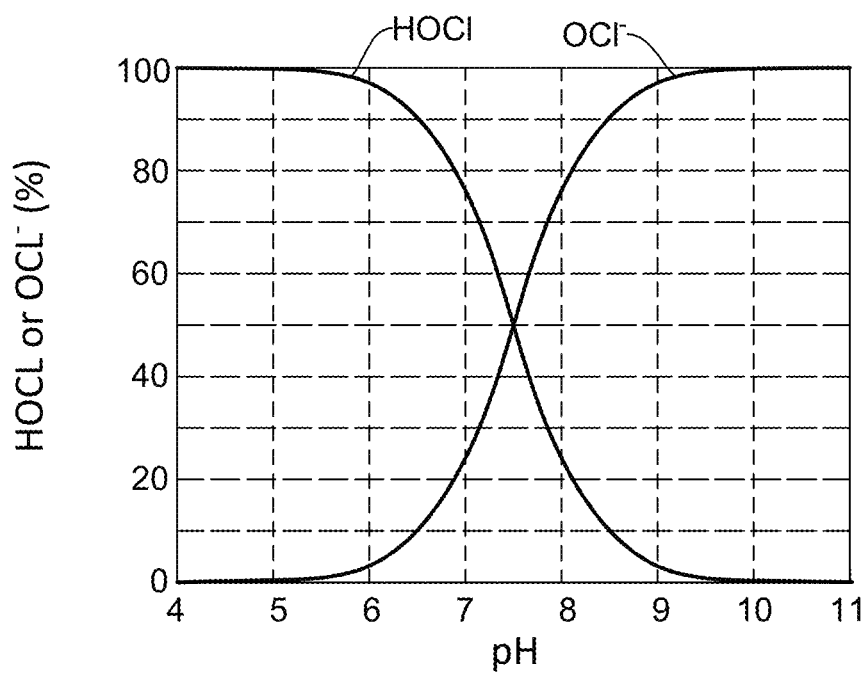
FIG. 5 is a graphical representation of the concentrations of hypochlorous acid and hypochlorite generated in solution as a function of the pH level of the solution.

With reference again to FIG. 1, the chlorine disinfection process 520 receives chlorine at a chlorine injection point 550 from a chlorine supply. It is contemplated that the chlorine supply may be of multiple different forms, where chlorine is part of a chemical compound or supplied as chlorine gas. However, according to one embodiment the chlorine supply is provided in a mixture form of either sodium hypochlorite (NaClO) or as calcium hypochlorite (Ca(OCl)2). Both sodium hypochlorite supplied in a liquid form and calcium hypochlorite supplied in a solid form are relatively stable and are safer to use for the disinfection process 520. Both are less concentrated than pure chlorine gas. As a result, the liquid or solid mixtures do not emit airborne chlorine as readily as pure chlorine gas, reducing the risk to personnel operating the disinfection process. When the chlorine gas, sodium hypochlorite, or calcium hypochlorite is added to water, they generate concentrations of both hypochlorous acid and hypochlorite. With reference to Table 1 below and to FIG. 5, the relative concentrations of hypochlorous acid and hypochlorite are shown as the percentage of overall chlorine present for disinfection as a function of the pH level of the water to be treated.

TABLE 1

Exemplary Percentages of Hypochlorous acid (HOCl) and Hypochlorite (OCl⁻)

| pH | % HOCl 32° F. (0° C.) | % OCl⁻ 32° F. (0° C.) | % HOCl 68° F. (20° C.) | % OCl⁻ 68° F. (20° C.) |
|---|---|---|---|---|
| 4 | 100.0 | 0.0 | 100.0 | 0.0 |
| 5 | 100.0 | 0.0 | 97.7 | 2.3 |
| 6 | 98.2 | 1.8 | 96.8 | 3.2 |
| 7 | 83.3 | 16.7 | 75.2 | 24.8 |
| 8 | 32.3 | 67.8 | 23.2 | 76.8 |
| 9 | 4.5 | 95.5 | 2.9 | 97.1 |
| 10 | 0.5 | 99.5 | 0.3 | 99.7 |
| 11 | 0.05 | 99.95 | 0.03 | 99.97 |

As illustrated in FIG. 5 and Table 1 above, the percent concentration of hypochlorous acid and hypochlorite generated when the chlorine is injected into the water to be treated is about equal when the water has a pH level of about 7.5. As the pH level decreases, the percent concentration of hypochlorous acid increases and the percent concentration of hypochlorite decreases. The shift in concentration of hypochlorous acid versus hypochlorite is significant because the effectiveness of the two compounds for disinfection is substantially different. Hypochlorous acid has about twenty to one hundred (20-100) times the effectiveness of killing pathogens or causing the pathogens to become inactive when compared to a similar concentration of hypochlorite in water. Consequently, a smaller volume of hypochlorous acid than hypochlorite is required to provide the same level of disinfection of the water to be treated.

As also illustrated in FIG. 5 and Table 1 above, when the chlorine supply is injected into the water to be treated, the chlorine will take the form of either the hypochlorous acid or hypochlorite and their respective from of the chlorine will be dependent on the pH level of the water. The concentration of hypochlorous acid and hypochlorite will vary as the pH level rises above or goes below 7.5, but the combination of the two pH dependent forms of chlorine will always sum to one hundred percent. Within a range of pH levels from about 6 to about 9, the concentrations change from almost entirely generating one form of chlorine to almost entirely generating the otherform of chlorine in water. For example, at a pH level of 6, the concentration of hypochlorous acid generated as a percent of this first available chlorine form is about ninety eight percent (98%) and the concentration of hypochlorite generated as a percent of this available chlorine form is about two percent (2%). Conversely, at a pH level of 9, the concentration of hypochlorous acid generated as a percent of the available chlorine form is about four percent (4%) and the concentration of hypochlorite generated as a percent of this second available chlorine form is about ninety-six percent (96%). Thus, a small change in the pH level of the water to be treated can have a significant impact on the effectiveness of the disinfection process.

Additionally, a step in the water treatment process 500 which is not illustrated in FIG. 1, involves neutralization of residual chlorine in the treated water 560 discharged from the chlorine disinfection process 520. Neutralization of residual chlorine is performed by the addition of another chemical, such as sodium bisulfite (NaHSO3) or sulfur dioxide gas (SO2). The amount of sodium bisulfite or sulfur dioxide gas required is proportional to the residual amount of chlorine present in the effluent discharge. As a result, if the pH level is controlled to maximize generation of hypochlorous acid, thereby minimizing the amount of sodium or calcium hypochlorite which is required, the amount of sodium bisulfite or sulfur dioxide required to neutralize residual chlorine can be similarly minimized. Thus, regulating the level of pH in the secondary treated wastewater 525 to be disinfected improves efficiency of the disinfection process 520 and reduces the volume of chemicals required, and therefore the cost, both at the initial stage (injection of chlorine) and potentially at dichlorination (removal of residual chlorine), the final step of the disinfection process.

Turning next to FIGS. 2 and 3, it is contemplated that the chlorine injection point 550 may be provided at various locations in the water treatment system 500. As shown in FIG. 2, the chlorine injection point 550 is provided at the carbon dioxide water stream 518 being transferred between the biogas treatment process 510 and the chlorine disinfection process 520. As shown in FIG. 3, the chlorine injection point 550 is at the biogas treatment process 510. Injection of the chlorine directly into the carbon dioxide water stream 518 or into the biogas treatment process 510 which ultimately generates the carbon dioxide water stream 518 such that the chlorine is delivered in tandem with the carbon dioxide water stream 518 may provide additional benefits of hypochlorous acid generation. As discussed in more detail below, the secondary treated wastewater 525 may have an initial pH in a range between seven and nine (7-9). The carbon dioxide water stream 518 may have a pH in the range of five to six and one-half (5-6.5). While the carbon dioxide water stream 518 is used to lower the pH range of the secondary treated wastewater 525, injecting the chlorine directly into the carbon dioxide water stream 518 allows generation of hypochlorous acid where the pH level in the carbon dioxide water stream may result in nearly one hundred percent (100%) of the available chlorine to form the hypochlorous acid. In addition, the biogas treatment system 510 may utilize a long pipe or coil of piping in the water wash process, which may range up to five hundred feet long and result in contact with the water during the biogas treatment process for times up to or exceeding one to two minutes. This extended period of contact with the water forming the carbon dioxide water stream provides additional mixing time and additional time for the sodium or calcium hypochlorite to generate hypochlorous acid before introduction into the second basin 540, providing more thorough and more efficient usage of the sodium hypochlorite or calcium hypochlorite.

Turning again to FIG. 1, a pH sensor 580 is included in the second basin 540 for the disinfection process 520. The pH sensor 580 generates a signal 582 corresponding to the pH level of the water present in the second basin 540. The signal 582 is provided to a controller 570 which is configured to regulate the pH level in the second basin 540 during the disinfection process 520. According to one embodiment of the invention, the controller 570 is an industrial controller such as a programmable logic controller (PLC). The controller includes a control program, or series of instructions, stored in non-transitory memory, such as a hard-drive, an optical drive, a magnetic drive, a solid-state drive, or the like. The control program, or series of instructions, is executed by a processor in the PLC. It is contemplated that a single storage device, or multiple storage devices, may be provided in the PLC. Similarly, a single processor or multiple processors or processing cores, configured to execute synchronously or asynchronously, may be provided. The industrial controller 570 receives input signals, such as the signal corresponding to the pH level in the second basin 540, and generates output signals to control operation of the water treatment system 500. It is further contemplated that a single controller 570 may control the entire system or separate controllers 570 may be provided at different portions of the water treatment system 500. For example, a first controller 570 may control the biogas treatment process 510, a second controller 570 may control upstream steps in the water treatment process, and a third controller 570 may control the disinfection process 520 and manage the pH level in the second basin 540. Each controller 570 may be in communication with the other controller to transfer signals corresponding to operation of the water treatment system 500 as required by each controller.

According to the embodiment illustrated in FIG. 1, it is contemplated that a pump and valve or other flow control device may be provided at the output of the biogas treatment process 510 or along the piping carrying the carbon dioxide water stream 518 from the biogas water treatment process to the disinfection process 520. The controller 570 receives the signal corresponding to the pH level in the second basin 540 and adjusts a flow rate of the carbon dioxide water stream 518 to achieve a desired pH level in the second basin 540. As discussed in more detail below, it is contemplated that the carbon dioxide water stream 518 may be pressurized and/or chilled as a result of the biogas treatment process 510. Pressurization and/or refrigeration of the water used in the biogas treatment process 510 allows for supersaturation of carbon dioxide in the carbon dioxide water stream 518. Different pressure levels and temperatures as well as differing amounts of carbon dioxide being removed from the biogas during the biogas treatment process 510 may result in varying levels of carbon dioxide present in the carbon dioxide water stream 518. A second pH sensor 584 may be provided to measure the PH level of the carbon dioxide water stream 518. The second pH sensor 584 also generates a signal 586 provided to the controller 570, and the controller 570 may further adjust the flow rate of the carbon dioxide water stream 518 as a function of both the pH level in the second basin 540 and of the pH level of the carbon dioxide water stream 518.

Alternately, or in addition, to the pH sensor 584 one or more additional sensors may be provided to measure process variables. For example, a sensor such as an oxidation reduction potential (ORP) sensor may be used to determine the relative amount of chlorine disinfection capability present in the water. An ORP sensor in a chlorine disinfection system provides a scaled indication of the amount of hypochlorous acid present, which is directly related to the pH level of the water being treated. The higher the value of a feedback signal from the ORP the greater the oxidation potential for disinfection purposes and the lower the value of the pH. As a result, the feedback signal from the ORP sensor may be provided to the controller 570 in addition or in place of the feedback signal from a pH sensor 584. The feedback signal for the ORP sensor corresponds to a disinfecting strength present in the second basin 540 as it detects the ability of a solution to act as a reducing agent which is a function of the relative levels of hypochlorous acid and hypochlorite as illustrate in FIG. 5. The feedback signal from the ORP sensor may be used by itself or combination with the feedback signal from the pH sensor to control injection of the carbon dioxide water stream 518 into the second basin 540 to increase the level of hypochlorous acid as a percent of the available chlorine available for disinfection.

With reference again to FIG. 2, it is contemplated that the carbon dioxide water stream 518 may be delivered into the second basin 540 with multiple injection devices or nozzles 590. Each nozzle 590 is located at a different depth within the second basin 540. When the carbon dioxide water stream 518 enters the water to be treated, the carbon dioxide is released from carbon dioxide water stream 518. The amount of carbon dioxide carried within the carbon dioxide water stream 518 will vary as a function of the pressure at which the carbon dioxide water stream 518 is maintained. When the carbon dioxide water stream 518 is released into the basin 540, the water in the basin to be treated is no longer under pressure and the extra carbon dioxide is released from the pressurized stream in the form of small gaseous bubbles within the water to be treated. The gaseous bubbles of carbon dioxide rise to the surface of the basin. A portion of the carbon dioxide mixes into the secondary treated wastewater 525 present in the second basin 540 and a portion of the carbon dioxide is released into the atmosphere. The efficiency of the mixing process is controlled in part by the amount of time the carbon dioxide is present in the basin 540. Therefore, releasing carbon dioxide at a greater depth allows more time for the carbon dioxide to be in contact with and, therefore, to mix and absorb into the water in the basin 540, causing a greater reduction in the pH level of the secondary treated wastewater 525 present in the second basin 540. One or more injectors, or nozzles, can be used at different depths within the basin 540 or, alternately, a nozzle at or above the surface of the basin may be activated to inject or spray the secondary treated wastewater 525 into the second basin 540 as a function of the pH level in the basin 540 and/or the pH level present in the secondary treated wastewater 525. The controller 570 may receive the feedback signal, or signals, 582, 586 corresponding to the pH level in the second basin or in the carbon dioxide water stream and regulate operation of the nozzles to achieve a desired pH level.

According to still another aspect of the invention, it is contemplated that not all of the carbon dioxide water stream 518 produced by the biogas treatment 510 process may be required to regulate the pH level in the disinfection process 520 to a desired pH level. As discussed in more detail below, various embodiments of the biogas treatment process 510 may be configured to release excess carbon dioxide. The controller 570 may receive the feedback signal, or signals, 582, 586 corresponding to the pH level in the second basin or in the carbon dioxide water stream and regulate operation of the carbon dioxide aeration or stripping process 300 to achieve a desired pH level.

Integration of the biogas process 510 into a water treatment system 500 results in the production of a purified methane stream, as discussed in more detail below, and a more efficient water treatment process by use of carbon dioxide supersaturated in water, which is a by-product of the biogas process 510. According to an exemplary application, a wastewater treatment plant anaerobic digester produces 250 cubic feet per minute (cfm) of biogas where the biogas has a typical carbon dioxide (CO2) concentration of thirty-five percent (35%) on a volume basis and the balance of the biogas is methane. Based on the CO2 gas concentration and rate of production of biogas, the anaerobic digester would produce the equivalent of about 14,500 pounds (lbs.) per day or 7.25 tons per day of CO2. In this example, about ninety-five percent (95%) of the CO2 gas from the raw biogas is dissolved by the water wash process resulting in about 13,100 lbs or 6.5 tons per day of CO2 available for pH adjustment in the downstream chlorination disinfection process 520. However, in an exemplary application, about seventy-five percent of the dissolved CO2 water may mix effectively to adjust the pH level in the disinfection process. As a result, about 9,800 lbs. or 4.9 tons of CO2 per day can be beneficially utilized from this biogas treatment process 510.

The controller 570 measures a pH level in the disinfection process 520 of about 7.4, which results in approximately an even division of hypochlorous acid and hypochlorite being generated as available chlorine for disinfection. For the exemplary application, a desired pH level of 6.8 is selected. Based on chemical equilibrium and assuming an alkalinity of 100 mg/l in the secondary treated wastewater 525, about 26 mg/l of additional CO2 is needed to lower the pH from 7.4 to 6.8 at a temperature of 65 deg F. assuming the secondary treated wastewater has an initial CO2 concentration of 8 mg/l. With reference to Table 1 and FIG. 5, lowering the pH level in the secondary treated wastewater from 7.4 to 6.8 would result in an effective increase in hypochlorous acid availability from about 55% to 80%. Based on the total additional 9,800 lbs per day of dissolved CO2 from this integrated biogas treatment process 510, adjusting the pH level from 7.4 to 6.8, and using a pre-determined chlorine dosage rate (for that particular pH), about 45.19 million gallons per day of secondary treated wastewater 525 could be treated.

The above-described minor adjustment in the pH level allows for approximately a twenty-five percent (25%) reduction in the amount of chlorine required to achieve the desired disinfection due to increased levels of hypochlorous acid present. In addition, there could be approximately a twenty-five percent (25%) reduction in the amount of sodium bisulfite required to neutralize residual chlorine. This reduction in the pH level by using the carbon dioxide water stream 518 can result in significant annual cost savings for disinfection chemicals used in the water treatment plant operations.

Figure 6:
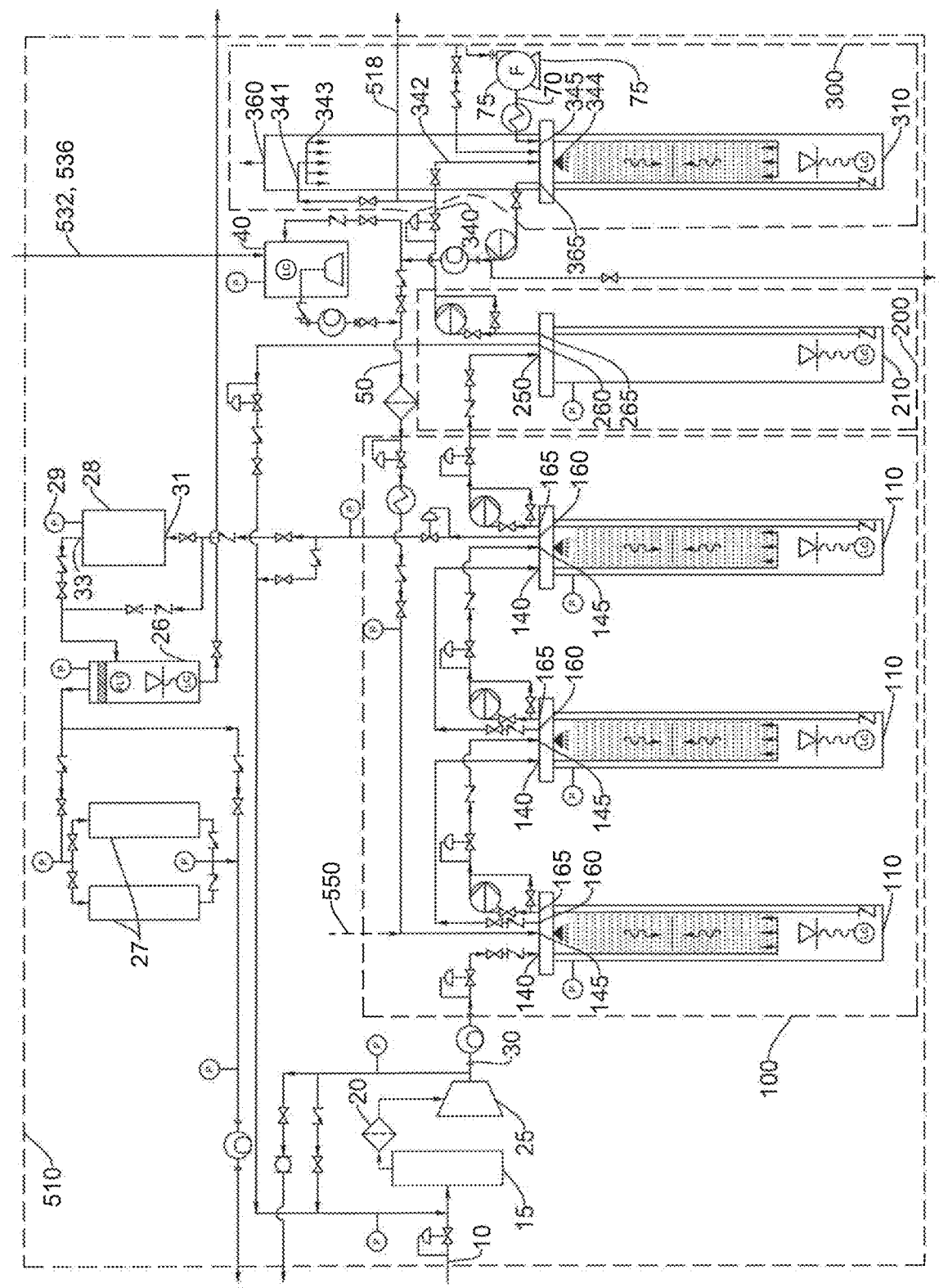
FIG. 6 is a schematic representation of an exemplary biogas treatment system incorporating one embodiment of the present invention.

Turning next to FIG. 6, an exemplary biogas treatment system utilized in one embodiment of the present invention is illustrated. A biogas stream 10 is provided as an input to the system, where the biogas may be produced, for example, from an anaerobic decomposition process. The anaerobic decomposition process may, for example, convert food waste, sewage, animal manure, landfill waste and the like into biogas. The biogas primarily includes methane and carbon dioxide with a lesser percentage of other constituents, such as nitrogen, oxygen, and hydrogen sulfide. Methane is typically present in a concentration of fifty to sixty-five percent (50-65%) by volume and carbon dioxide is typically present in a concentration of thirty-five to fifty-five percent (35-50%) by volume. The disclosed water wash process employed by the biogas treatment system removes the carbon dioxide and other trace constituents, such as hydrogen sulfide and siloxanes, resulting in a purified biogas stream having a methane content of up to about ninety-eight percent (98%) and carbon dioxide content to about two percent (2%). The resulting purified biogas stream may be used as a replacement fuel for natural gas, for example, in a compressed natural gas vehicle engine or other natural gas fuel energy applications. Although the invention will be discussed with respect to a water wash process for treating biogas, it is understood that the system may be used to treat other gas mixtures in which the relative solubility of one gas in the mixture is substantially higher than the other gas in the mixture.

Some initial processing of the biogas stream may occur prior to supplying the biogas stream to the water wash system. An optional hydrogen sulfide (H2S) removal process 15 such as an iron sponge type system may be inserted in series with the biogas stream 10 to perform an initial removal of hydrogen sulfide present in the biogas stream. Because hydrogen sulfide is corrosive, removal of the gas at an initial stage limits the effects of the gas on the system components through the water wash process. Optionally, hydrogen sulfide may be removed in the off-gas exhaust output from the stripping process. The biogas stream may also be passed through a filter 20 to remove particulate content. In addition, carbon dioxide has increased solubility characteristics with decreasing temperature and increasing pressure. The biogas stream is, therefore, passed through a compressor 25 to achieve an elevated pressure. The pressure range of the compressed biogas stream 30 may be between ten and two hundred pounds per square inch gauge (10-200 psig). According to one embodiment of the invention, the pressure range of the compressed gas is between about sixty and one hundred pounds per square inch gauge (60-100 psig). The compressed biogas may also be chilled, for example, to between thirty-five and sixty-eight degrees Fahrenheit (35-68° F.). The compressed and/or chilled biogas stream 30 is provided as an input to the water wash process.

The water wash process utilizes water to remove the carbon dioxide from the biogas stream. According to the illustrated embodiment, water is provided to a holding tank 40 from which a water stream 50 is provided to the water wash process. Water provided to the holding tank 40 may be chilled and/or under pressure to facilitate the water wash process. As discussed above, secondary treated wastewater 525 from a water treatment system 500 in which the biogas treatment process is integrated may be a source of water. The secondary treated wastewater 525 may be supplied to the holding tank 40 or directly input to the first riser 110. Optionally, the holding tank 40 may incorporate a chiller and/or a compressor to chill or pressurize the water prior to supplying it in the water stream. The water, for example, may be chilled to between thirty-five and sixty-eight degrees Fahrenheit (35-68° F.) and pressurized to mix with the compressed biogas stream 30 at about the same input pressure of the compressed biogas stream. The carbon dioxide has significantly more solubility in water than methane and the solubility is further improved with increased pressure and reduced temperature. Thus, providing a chilled and/or pressurized water stream 50 and a compressed and/or chilled biogas stream 30 into the absorption risers 110 enhance the absorption of carbon dioxide from the biogas and into the water and, thereby also provide a super-saturated carbon dioxide water stream 518 from the biogas treatment process 510.

Although discussed herein with respect to a water-wash process, it is contemplated that a carbon dioxide water stream 518 may be generated from any suitable biogas treatment process. For example, a membrane separation process may receive a stream of biogas as an input and pass this stream of biogas through a membrane. The membrane separates the methane from the carbon dioxide. The resulting carbon dioxide may be channeled to the pH reduction process discussed above. According to one embodiment, the carbon dioxide resulting from the membrane separation process may be introduced into water to form a carbon dioxide water stream 518. Additionally, the water into which the carbon dioxide is introduced may be pressurized and/or chilled to generate a super-saturated carbon dioxide water stream 518.

Figure 10:
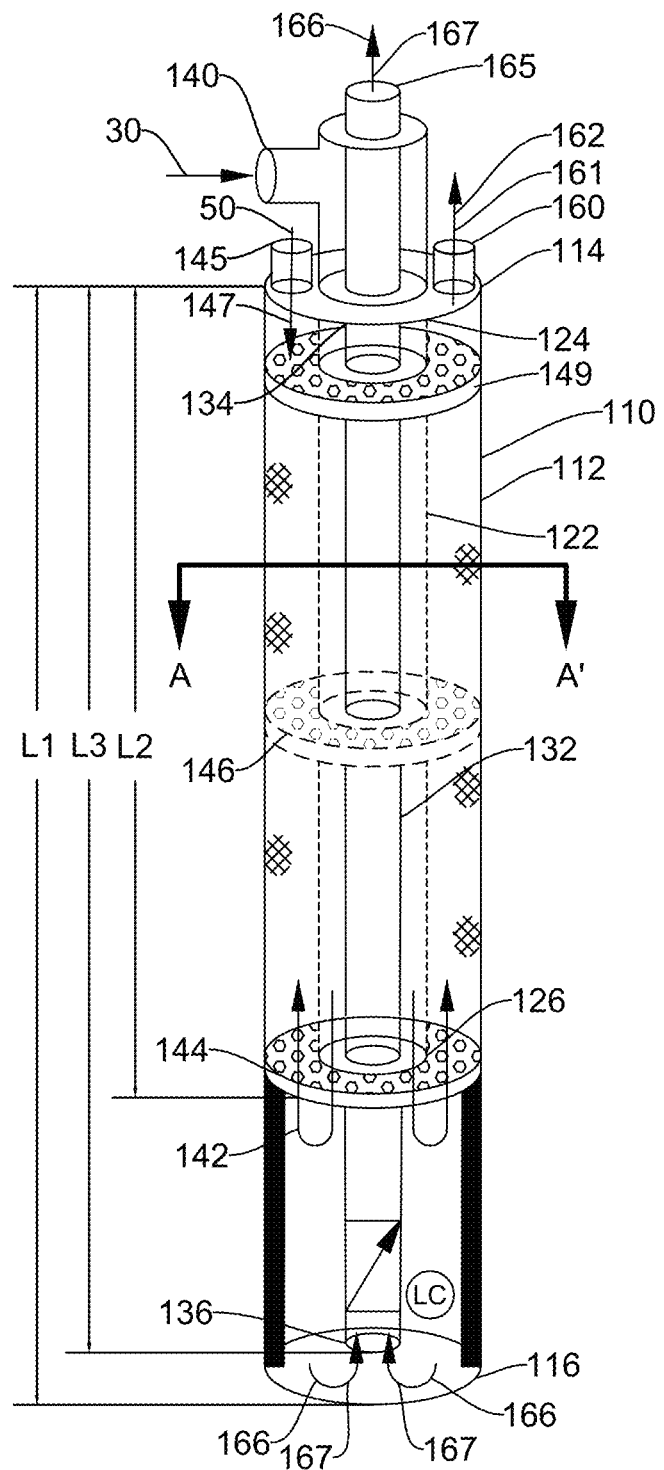
FIG. 10 is a front view of one embodiment of an absorption riser from the biogas treatment system of FIG. 6.

The water wash process begins with an absorption process 100 that has multiple absorption risers 110 operatively connected together to remove the carbon dioxide from the compressed biogas stream 30. Referring also to FIG. 10, each absorption riser 110 includes multiple pipes. In the illustrated embodiment, the absorption riser 110 includes an outer pipe 112, a first inner pipe 122, and a second inner pipe 132. According to the illustrated embodiment, each of the pipes is concentric to the others. Optionally, the first inner pipe 122 and the second inner pipe 132 may be positioned adjacent to each other or extend downward at different locations within the outer pipe 112. The outer pipe 112 has a first end 114, a second end 116, and a first length, L1. The first inner pipe 122 has a first end 124, a second end 126, and a second length, L2. The second inner pipe 132 has a first end 134, a second end 136, and a third length, L3. According to one embodiment of the invention, each of the absorption risers 110 are installed in a vertical orientation, such that the first ends 114, 124, 134 of each pipe 112, 122, 132 are generally positioned at the top of each absorption riser 110. The first inner pipe 122 extends for the second length, L2 into the outer pipe 112 such that the compressed biogas stream 30 may be delivered into a lower segment of the absorption riser 110. According to the illustrated embodiment, the first inner pipe 122 is cylindrical and open at the second end 126. The compressed biogas stream 30 flows from the first inlet 140 and exits at the second end 126 of the first inner piper 122. The second inner pipe 132 extends for the third length, L3, through the first inner piper 122, beyond the second end 126 of the first inner pipe 122, and into the outer pipe 112. The second inner pipe 132 is cylindrical and the second end 136 of the second inner pipe 132 includes a check valve between the interior of the outer pipe 112 and the interior of the second inner pipe 132.

Each absorption riser 110 includes a set of inlets and outlets to allow water and biogas to flow into and out of the riser 110. A first inlet 140 receives the compressed biogas stream 30 and is located on the first end 114 of the outer pipe 112. The first inlet 140 is in fluid communication with the first end 124 of the first inner pipe 122 and establishes a flow path for the compressed biogas stream 30 into the absorption riser 110. The first inner pipe 122 extends into the absorption riser 110 for the length, L2, of the inner pipe 122. According to the embodiment illustrated in FIG. 10, the second end 126 of the first inner pipe 122 terminates at a dispersion element 144 proximate the second end 116 of the first inner pipe 122. A second inlet 145 receives the water stream 50 and is located on the first end 114 of the outer pipe 112. The second inlet 145 is in fluid communication with the first end 114 of the outer pipe 112 to dispense the water stream 50 from the top of the absorption riser 110. As will be discussed in more detail below, the water stream 50 is dispensed at the top of the interior of the absorption riser 110 via the second inlet 145 and the compressed biogas stream 30 is dispensed at the bottom of the interior of the absorption riser 110 via the first inner piper 122, and the compressed biogas stream 30 passes up through the water stream 50 within the absorption riser 110. As the water stream 50 falls to the bottom of the absorption riser 110 it mixes with the biogas stream and the carbon dioxide within the compressed biogas stream 30 is dissolved into the water. Although small amounts of methane may be absorbed in the water, the majority of the methane remains unabsorbed and rises to the top of the absorption riser 110. Because carbon dioxide is removed from the compressed biogas stream 30 as it interacts with the water stream 50, the flow of biogas resulting from mixing with the water will be referred to herein as a purified biogas stream 162. Similarly, because the water stream 50 absorbs carbon dioxide from the compressed biogas stream 30, the resulting water stream will be referred to herein as a mixed water stream 166.

Figure 11:
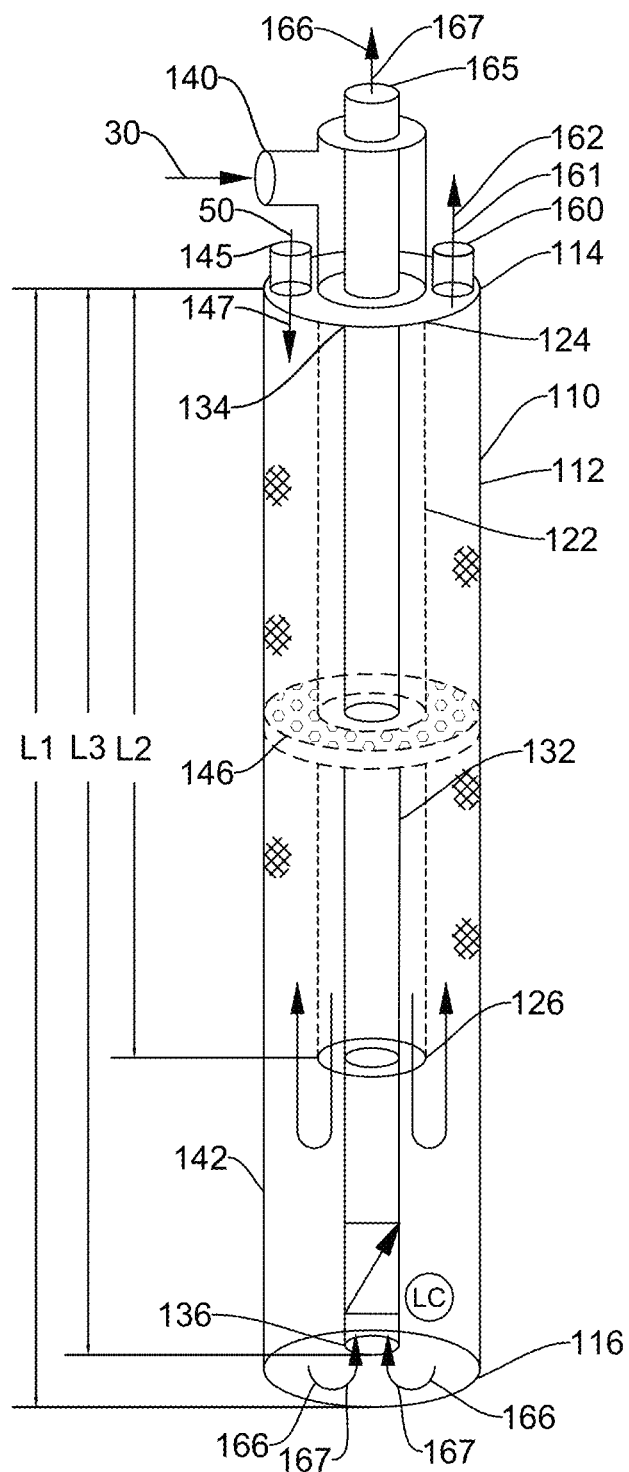
FIG. 11 is a front view of another embodiment of an absorption riser from the biogas treatment system of FIG. 6.
Figure 20:
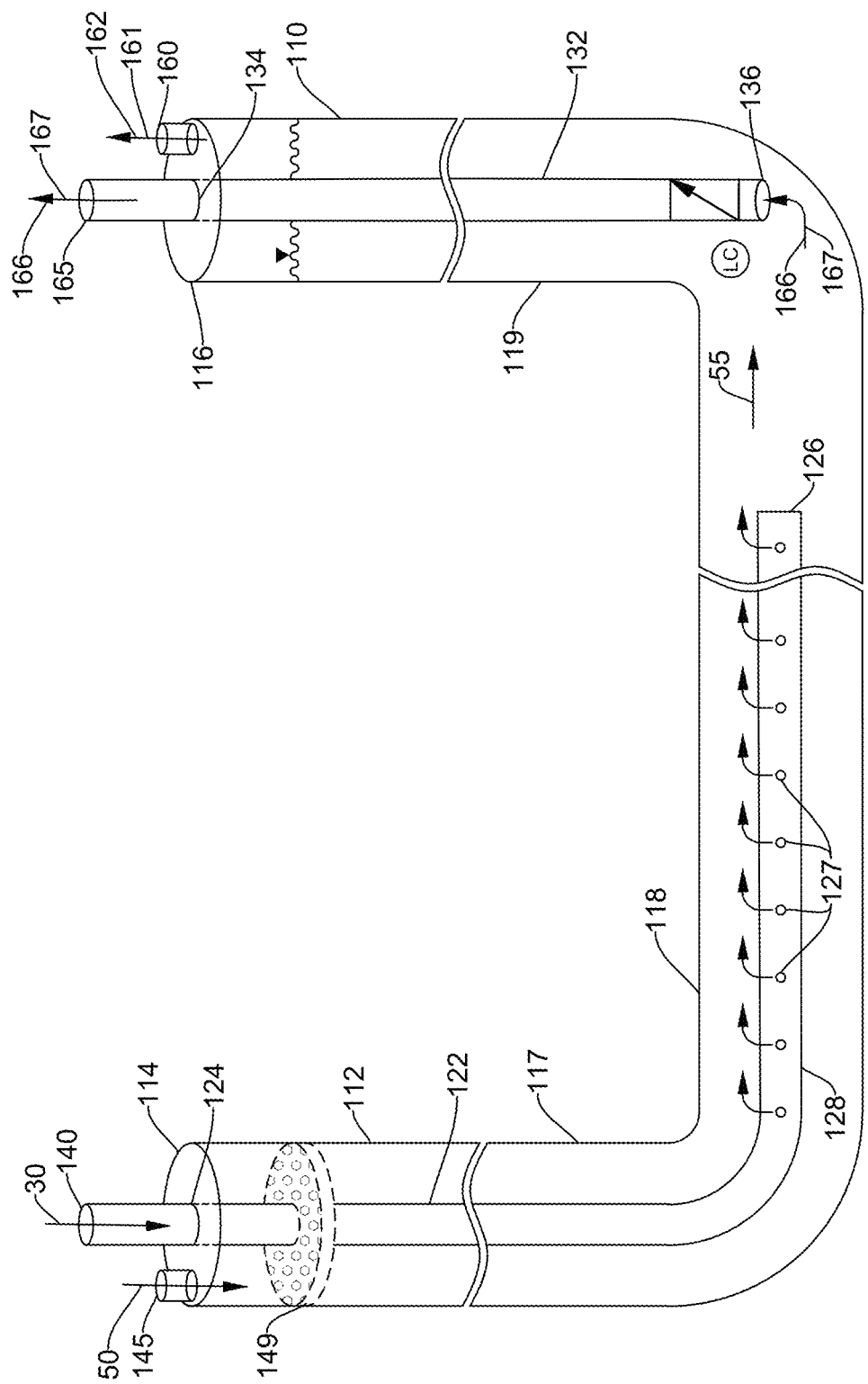
FIG. 20 is a schematic representation of an exemplary biogas treatment system incorporating a horizontal absorption riser according to another embodiment of the present invention.
Figure 21:
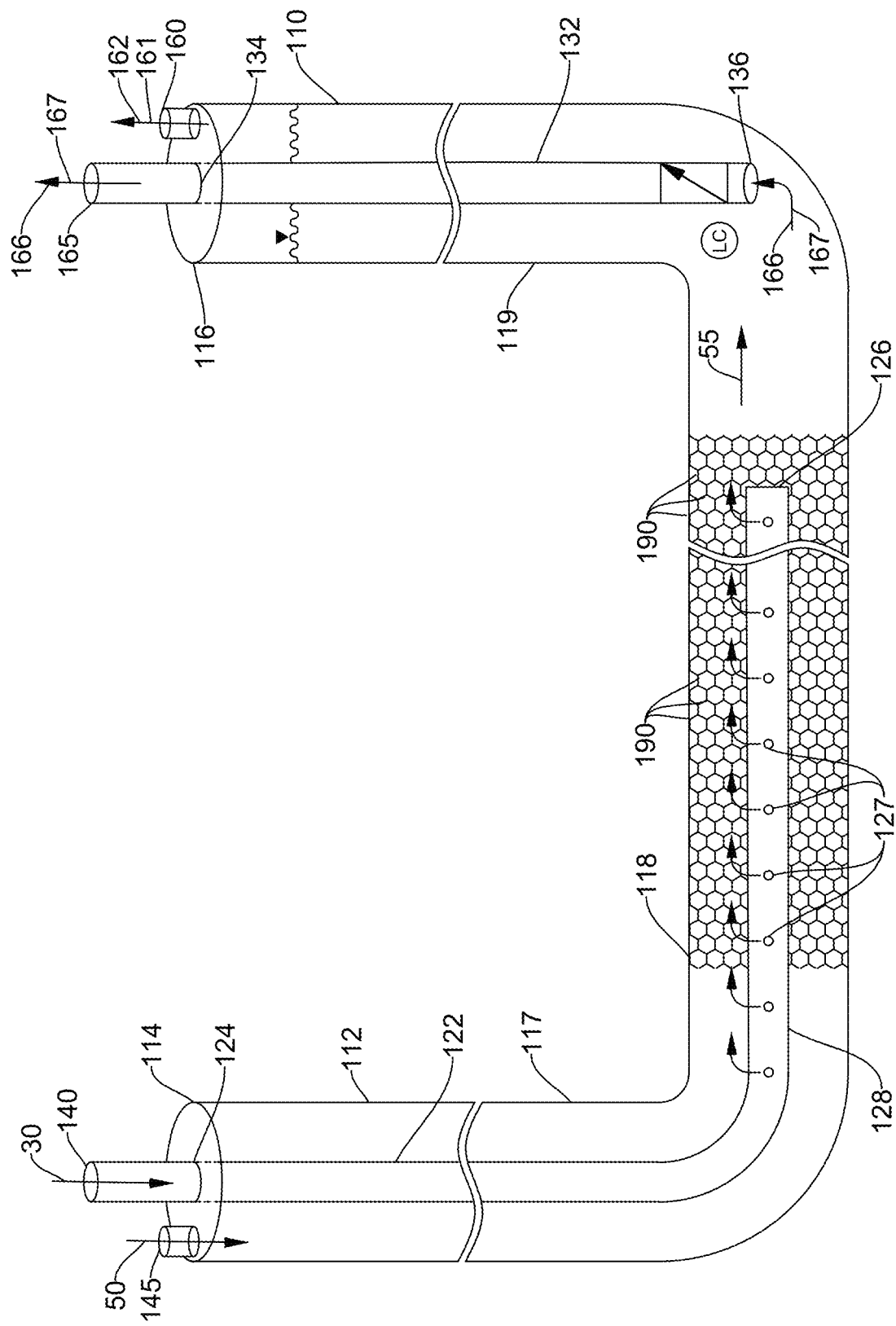
FIG. 21 is a schematic representation of an exemplary biogas treatment system incorporating a horizontal absorption riser according to another embodiment of the present invention.
Figure 22:
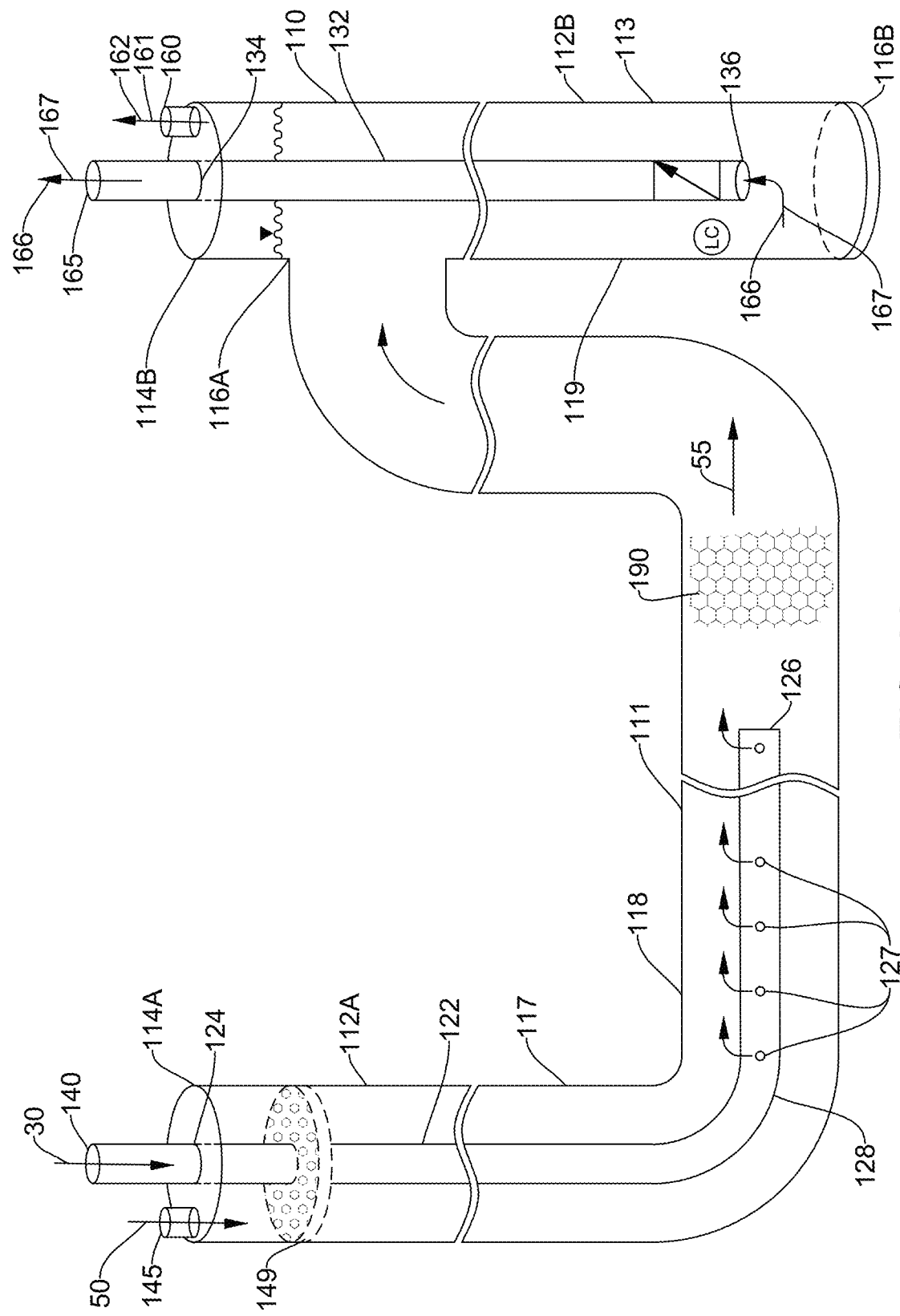
FIG. 22 is a schematic representation of an exemplary biogas treatment system incorporating a horizontal absorption riser according to another embodiment of the present invention.

According to the embodiment illustrated in FIG. 11, the second end 126 of the first inner pipe 122 simply terminates within the outer pipe 112 without a dispersion element 144 located proximate the second end 126 of the first inner pipe 122. The second end 126 of the first inner pipe 122 may be configured to disperse the compressed biogas stream 30 into water flowing within the outer pipe 112. The dispersion may be achieved, for example, via a series of holes 127 located along the length of the first inner pipe 122 as shown in FIGS. 20-22, via a nozzle, or series of nozzles positioned at the second end 126, or via other dispersion methods which are integrally formed with the first inner pipe 122. Optionally, a series of nozzles may be located along the length of the first inner pipe 122, where each nozzle disperses a portion of the biogas stream within the outer pipe 112. According to still another option, multiple inner pipes 122 may be provided, where each inner pipe 122 includes a series of holes 127 or nozzles spaced along the length of each inner pipe 122 to facilitate dispersion of the biogas stream 30 throughout the interior of the outer pipe 112. It is contemplated that an optional dispersion element 146 may still be located within the outer pipe 112 at a location between the inlet of the water stream and the inlet of the compressed biogas stream within the absorption riser 110 if desired for further mixing of the two streams.

A first outlet 160 located at the first end 114 of the outer pipe 112 provides a flow path 161 for the purified biogas stream 162 to exit the absorption riser. The first outlet 160 is in fluid communication with and receives the purified biogas stream 162 from the interior of the outer pipe 112. A second outlet 165 is also located at the first end 114 of the outer pipe 112 and provides a flow path 167 for the mixed water stream 166. The second outlet 165 is in fluid communication with the first end 134 of the second inner pipe 132. The mixed water stream 166 enters the second end 136 of the second inner pipe 132 and travels up through the second inner pipe 132 to the second outlet 165. According to the illustrated embodiment, each of the outer pipe 112, first inner pipe 122, and second inner pipe 132 are concentric about a central axis. The second inner pipe 132 is located within the first inner pipe 122, which is, in turn, located within the outer pipe 112. As discussed above and for purposes of illustration in FIG. 10, the first end 114, 124, 134 of each pipe 112, 122, 132 ends at substantially the same point. It is contemplated that in various embodiments the first end 124, 134 of each of the first inner pipe 122 and the second inner pipe 132 may extend for a short distance beyond the first end 114 of the outer pipe 112 to facilitate connections between each pipe and an inlet or outlet. It is further contemplated that an inlet 140, 145 or outlet 160, 165 may be positioned along and enter the outer pipe 112 via a side wall proximate the end of the absorption riser 110. For example, the first inlet 140 is shown connecting generally orthogonally to a wall of the first inner pipe 122 beyond the first end 114 of the outer pipe and the second inner pipe 132 extends through an end wall of the first inner pipe 122 to connect to the second outlet 165. Alternately, the first inlet 140 or second outlet 165 may include a fixture connected to the first end 114 of the outer pipe 112 and comprise the necessary connections to establish the fluid flow paths from the inlet and outlet to the inner pipes extending into the outer pipe 112.

With reference again to FIG. 10, each absorption riser 110 may also include one or more dispersion elements located within the flow path to facilitate mixing of the compressed gas stream 30 with the water stream 50. A first dispersion element 149 is located in the flow path 147 of the water stream 50 as it exits the second inlet 145, and a second dispersion element 144 is located in the flow path 142 of the compressed gas stream 30 as it exits the second end 126 of the first inner pipe 122. Each dispersion element 144, 149 is operable to distribute either the compressed gas stream 30 or the water stream 50 throughout the interior of the outer pipe 112. According to the illustrated embodiment, each dispersion element 144, 149 is a diffuser plate, where the diffuser plate extends around the first inner pipe 122, forming a disk within the interior or the outer pipe 112. The diffuser plate includes multiple holes extending through the plate which allow the water and gas to flow through. The holes are distributed around the surface of the disk such that water and gas flow through and are distributed throughout the interior of the outer pipe 112.

With reference again to FIG. 11, it is contemplated that one or more of the dispersion elements are optionally included within the absorption riser. It is contemplated that other methods of distributing the compressed gas stream 30 and/or the water stream 50 within the absorption riser may be utilized without deviating from the scope of the invention. For example, one or more sparging tubes may be operatively connected to the second inlet 145 or to the second end 126 of the first inner pipe 122 and arranged within the interior of the outer pipe 112 to distribute the water and gas throughout the interior of the outer pipe 112. According to still another embodiment, spray nozzles may be operatively connected to the second inlet 145 or to the second end 126 of the first inner pipe 122 to discharge the water and gas as a mist throughout the interior of the outer pipe 112. An additional dispersion element 146, may be included within the combined streams if desired for further mixing of the water stream 50 with the compressed gas stream 30. According to still other embodiments, various combinations of dispersion elements may be utilized. Each dispersion element distributes the water and gas in finer jets, flows, or droplets to increase the surface area of water and gas present within the outer pipe 112. The increased surface area of water and gas increases the area at which the water and gas may contact each other and thereby increasing the area across which carbon dioxide may transfer from the compressed biogas stream 30 to the water stream 50.

Figure 14:
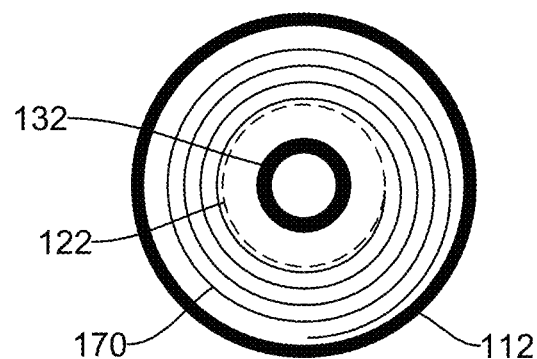
FIG. 14 is a sectional view of the absorption riser of FIG. 10 taken at A-A' illustrating one embodiment of a packing material incorporated into the absorption riser.
Figure 15:
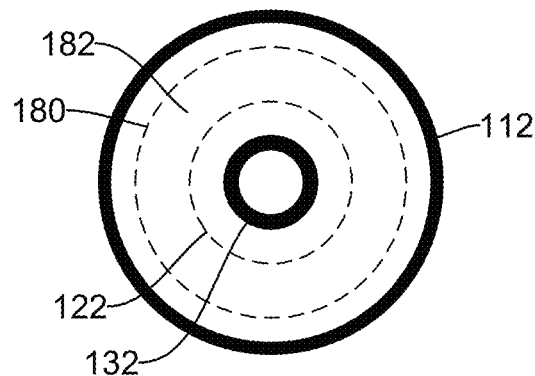
FIG. 15 is a sectional view of the absorption riser of FIG. 10 taken at A-A' illustrating another embodiment of a packing material incorporated into the absorption riser.

It is further contemplated that each absorption riser may include packing material within at least a portion of the interior of the outer pipe 112 to further enhance the mixing of the compressed biogas stream 30 with the water stream 50. In FIG. 10, an additional dispersion plate 146 is shown. One or more additional dispersion plates 146 may be distributed along the length of the interior of the outer pipe 112 to continually redistribute the gas and water as they travel through the interior of the pipe. With reference also to FIGS. 14 and 15, other packing material may be inserted into the outer pipe 112. In FIG. 14, a flexible material 170 is rolled into a coil and inserted between the inner periphery of the outer pipe 112 and the outer periphery of the first inner pipe 122. According to one embodiment of the invention, the flexible material 170 is a netting material, such as a geonet, including multiple holes throughout the material. As the water and gas pass through the absorption riser 110, the netting and the multiple holes create numerous flow paths and opportunities for collisions and, thereby, increasing contact surface area between the water and biogas for transfer of the carbon dioxide from the biogas to the water. In FIG. 15, a mesh material 180 may be formed into a basket or bag and is used to contain another bulk material 182 within the mesh. The bulk material is preferably a material that allows the water and gas to flow through while increasing contact between the water and gas. Optionally, the bulk material may be a medium that has absorptive characteristics such as activated carbon or zeolites which may further aid in the removal of trace constituents from the compressed biogas stream 30. The mesh and bulk materials 180, 182 may be inserted into and removed from the interior of the outer pipe 112 as a unit. Both the flexible material 170 and the mesh and bulk material combination 180, 182 facilitate cleaning of the packing material. The flexible material 170 may be removed and unrolled for cleaning. The mesh and bulk material 180, 182 may be pulled out of the outer pipe 112 and the bulk material spread out for cleaning. Once clean, the flexible material 170 may be rolled back into a coil and inserted back into the outer pipe 112. Similarly, the bulk material 182 may be placed back into the mesh material 180 and inserted into the outer pipe 112.

With reference again to FIG. 6, it is contemplated that multiple absorption risers 110 may be connected in series. The effect of connecting the absorption risers 110 in series is to create an overall longer length of pipe greater than the length of a single riser through which the compressed biogas stream 30 interacts with the water stream 50, allowing for a greater concentration of carbon dioxide to be transferred from the compressed biogas stream 30 to the water stream 50. One of the absorption risers 110 is designated as an initial absorption riser in the system and receives the initial input of the compressed biogas stream at the first inlet 140 and the water stream 50 at the second inlet 145. The first outlet 160 of the initial absorption riser is connected to the first inlet 140 of another absorption riser 110 and the second outlet 165 of the initial absorption riser is connected to the second inlet 145 of the other absorption riser 110. This sequence of connections repeats for each absorption riser in the system until a final absorption riser is reached. At the final absorption riser, the first inlet 140 still receives the biogas stream from the first outlet 160 of the preceding absorption riser and the second inlet 145 receives the water stream from the second outlet 165 of the preceding riser. However, the first outlet 160 of the final absorption riser provides the purified biogas stream 162 and the second outlet 165 of the final absorption riser provides the mixed water stream 166. As the biogas and water streams progress through each absorption riser, the concentration of carbon dioxide in the biogas stream is incrementally reduced and the concentration of carbon dioxide in the water stream is incrementally increased from the starting level at the initial absorption riser to the final levels at the final absorption riser.

Figure 7:
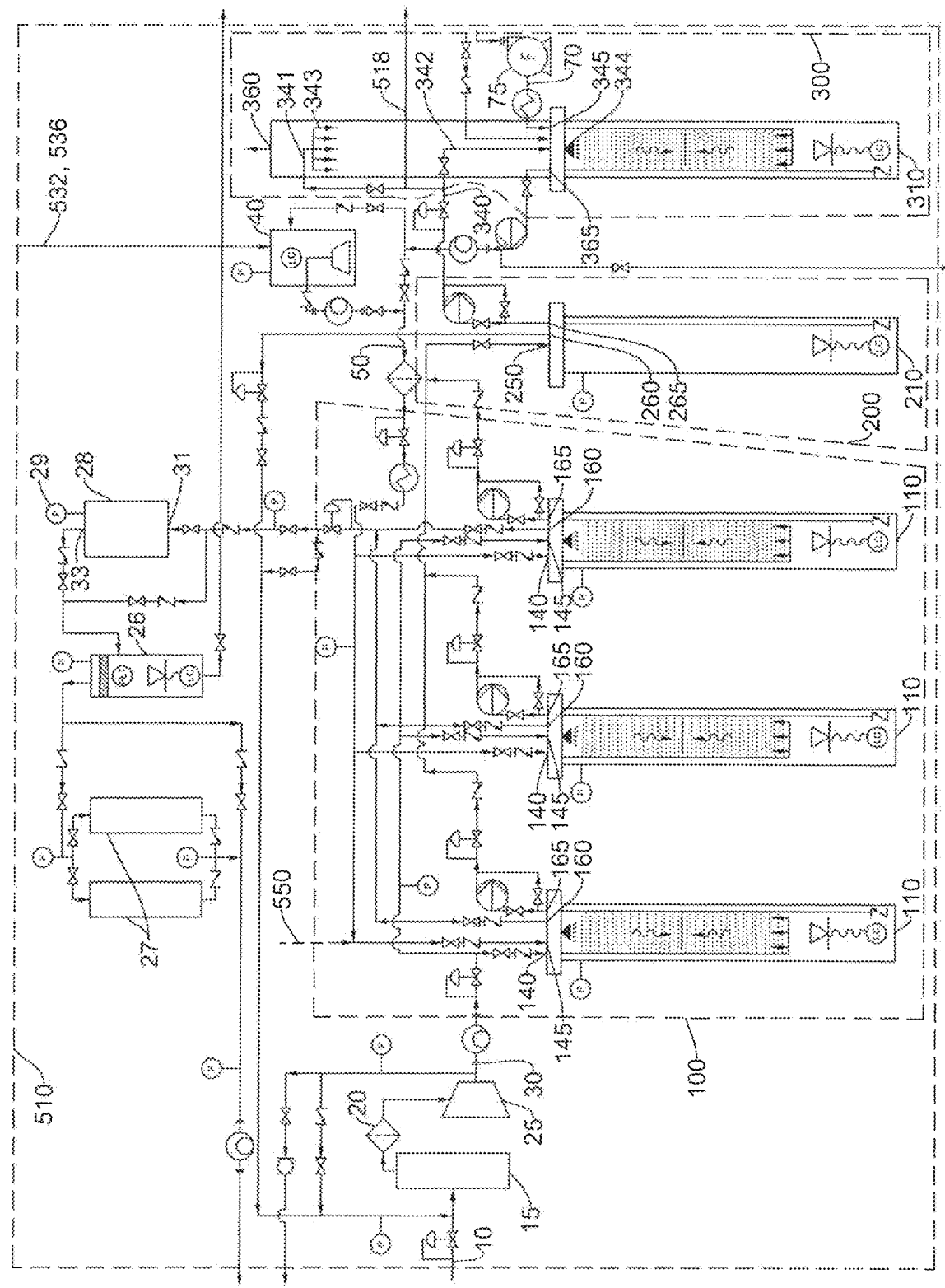
FIG. 7 is a schematic representation of an exemplary biogas treatment system incorporating another embodiment of the present invention.

With reference next to FIG. 7, it is also contemplated that multiple absorption risers 110 may be connected in parallel. Each of the compressed biogas stream 30 and the water stream 50 are split and portions of each stream are supplied to each riser. As illustrated, the compressed biogas stream 30 is provided to the first inlet 140 of each absorption riser 110, and the water stream 50 is provided to the second inlet 145 of each absorption riser 110. The first outlet 160 of each absorption riser is connected to a junction at which the purified biogas stream 162 from each absorption riser is combined and delivered from the system. Similarly, the second outlet 165 of each absorption riser is connected to a second junction at which the mixed water stream 166 from each absorption riser is combined and may be transferred for further processing. To achieve comparable purifying performance to the serial connection discussed above, the volume of biogas introduced into each absorption riser 110 may be split between each absorption riser while the volume of water introduced into each riser remains the same. Thus, a greater volume of water per unit is available for interaction with the same volume of biogas, allowing a greater percentage of the carbon dioxide to be removed in a single absorption riser than when the entire flow of biogas enters a single riser.

According to still another aspect of the invention, it is contemplated that the absorption risers 110 may be connected in a combination of serial and parallel connections. For example, two or three absorption risers 110 may be connected in series as a set of absorption risers with multiple sets of absorption risers connected in parallel. Alternately, the biogas stream 30 may enter a first absorption riser 110 and pass through subsequent absorption risers in series and the water stream 50 may be supplied to the absorption risers in parallel, thereby maximizing the transfer of carbon dioxide from the biogas stream to the water stream at each riser.

In addition to determining whether to connect the absorption risers 110 in series or parallel, a number of other design criteria are considered when configuring the water wash system. As previously discussed, the gas and/or water stream may be cooled or compressed. Further, the diameter and length of each absorption riser 110 is evaluated. In addition, the material from which the absorption riser is constructed must be determined.

Existing water wash systems typically utilize a single stainless steel vessel with a height ranging from twenty to sixty feet and a diameter up to six feet. The size of the vessel, the materials from which it is constructed and the weight of the water and biogas within the vessel further requires structural considerations such as a reinforced concrete footing to support the weight and horizontal stabilization members to prevent tipping.

In contrast, the absorption risers 110 of the present system are constructed from a non-metallic material and, preferably, are constructed of a plastic or reinforced resin material. According to one embodiment of the invention, the risers are made from a polyethylene material, such as high density polyethylene (HDPE) or medium density polyethylene (MDPE), or from a polyimide material. Optionally, the risers may be made from polyvinyl chloride (PVC) or fiberglass. The materials are lighter and less expensive than existing materials, reducing system costs and making construction easier.

Figure 16:
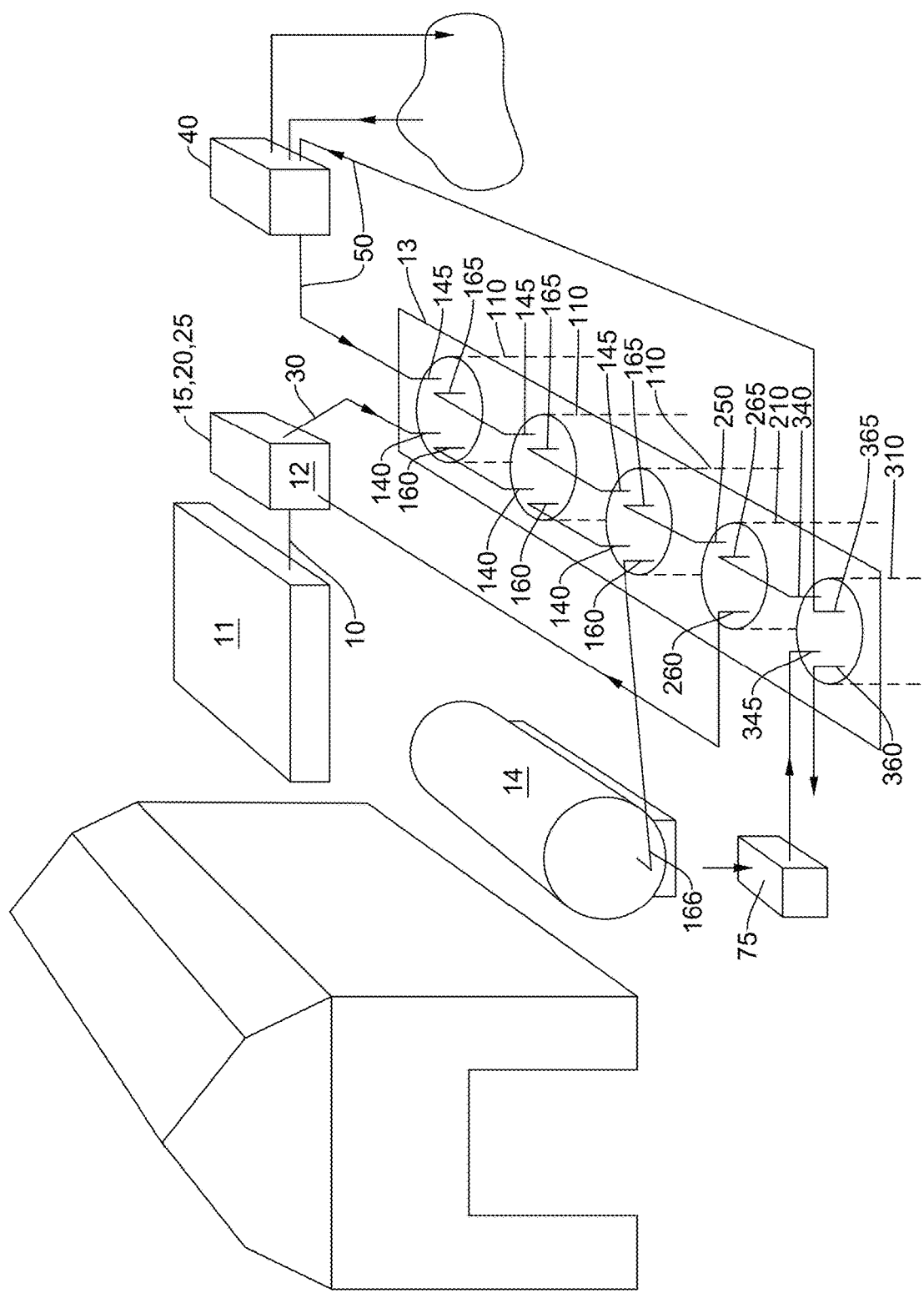
FIG. 16 is an exemplary application incorporating one embodiment of the present invention.

With reference next to FIG. 16, an exemplary installation of one embodiment of the present invention at a farm is illustrated. The farm includes an anaerobic digester 11 to break down animal waste created on the farm. The raw biogas stream 10 output from the anaerobic digester 11 is provided to an initial processing stage 12. With reference also to FIG. 6, the initial processing stage 12 may include the hydrogen sulfide cleaner 15, filter 20, and compressor 25. The initial processing stage, therefore, removes hydrogen sulfide from the raw biogas stream 10 and then filters and compresses the biogas stream, providing a compressed biogas stream 30 to a series of absorption risers 110, a flash riser 210, and an air stripping riser 310.

Each of the risers 110, 210, 310 are installed in a trench 13 and substantially below grade. The diameter of each riser is preferably in the range of four to thirty inches (4-48 in.) and the length may be, for example twenty feet (20 ft.). The trench may be dug using conventional excavation methods and each riser inserted within the trench. Optionally, an auger may be used to drill individual holes into the ground and each riser is inserted into one of the holes. The top of each riser is at or above grade to provide for connection of tubing and fittings for transmitting biogas and/or water to and from each riser. After each riser is installed within the trench 13 or hole, the trench or hole may be back-filled so the earth surrounds each riser. The earth surrounding each riser provides a number of benefits, such as protection from ultraviolet radiation in outdoor installations, insulation for the chilled water, and physical support for each riser when it is filled with biogas and water. In alternate embodiments of the invention, it is contemplated that the risers may be installed below grade, above grade, or a combination thereof. When either a portion or all of a riser is installed above grade, it is contemplated that one or more exterior sleeves may cover the portion of the riser above grade. Each sleeve may provide ultraviolet (UV) ray protection, insulation, support, or a combination thereof for the portion of the riser that is above grade and no longer protected, insulated, or supported by the ground. According to still other embodiments of the invention, a riser may be submerged in water, where the water similarly provides some UV ray protection, insulation and support for the submerged risers. Optionally, one or more exterior sleeves may be used in combination with submerging each riser to further protect, insulate, or support each riser.

As the name implies, the water wash system requires a supply of water by which the carbon dioxide is removed from the biogas stream. In some applications, such as a waste water treatment system, there may be a continuous supply of water, such as the secondary treated wastewater 525. In the illustrated embodiment, a holding tank 40 is provided to supply the water. Water may be drawn from a pond or lake or otherwise be supplied from a well or from a municipal water supply. As previously discussed, the water may be chilled and/or compressed prior to being pumped to the absorption riser 110.

The water stream 50 and compressed gas streams each enter the top of each absorption risers 110 in a series arrangement as also shown in FIG. 6. A portion of the carbon dioxide is transferred from the compressed biogas stream 30 to the water stream 50 in each absorption riser 110. The compressed biogas stream 30 travels down a pipe to the lower portion of the absorption riser and the water stream 50 enters the top of the absorption riser. The compressed biogas rises and the water falls within each absorption riser 110, creating contact between the two streams. The partly purified biogas stream exits a first outlet 160 at the top of the initial absorption riser, and the mixed water stream 166 is internally pumped from the bottom of the absorption riser 110 to the top and exits a second outlet 165 also at the top of the absorption riser. Each subsequent absorption riser 110 in the series receives the partly purified biogas stream and mixed water stream from the prior absorption riser at the inlets and transfers additional carbon dioxide from the biogas stream to the water stream. The final absorption riser 110 contains the purified biogas stream which exits at the first outlet 160. According to the illustrated embodiment, the purified biogas stream 162 is provided to a storage tank 14 from which it may be used as a fuel. According to other embodiments and as illustrated in FIGS. 6-9, the purified biogas stream 162 may undergo some additional processing prior to use. For example, a first moisture removal vessel 26 and/or a subsequent desiccant dryer 27 may be provided to remove water from the purified biogas stream 162. Still other processing steps may be provided for polishing the gas to remove, for example, trace constituents or additional carbon dioxide still remaining in the biogas stream 162.

Figure 25:
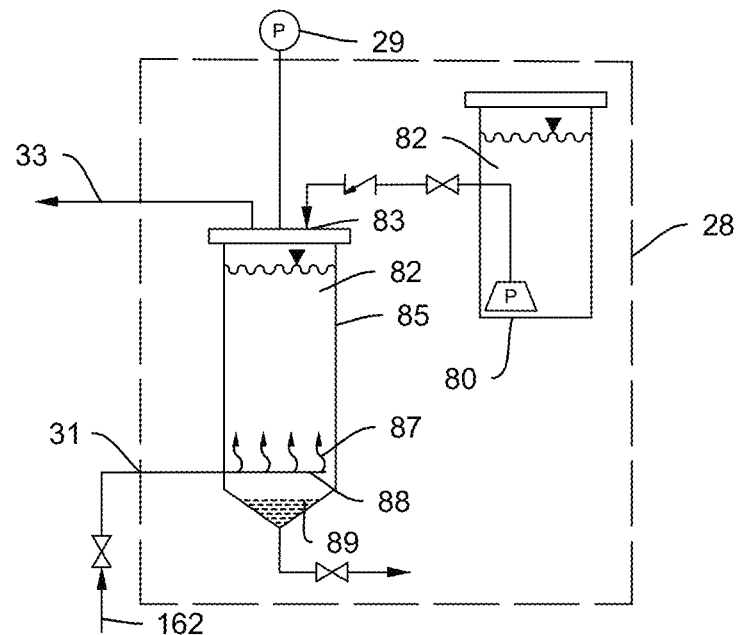
FIG. 25 is schematic representation of one embodiment of a polishing process incorporated into the biogas treatment system of FIG. 6.
Figure 26:
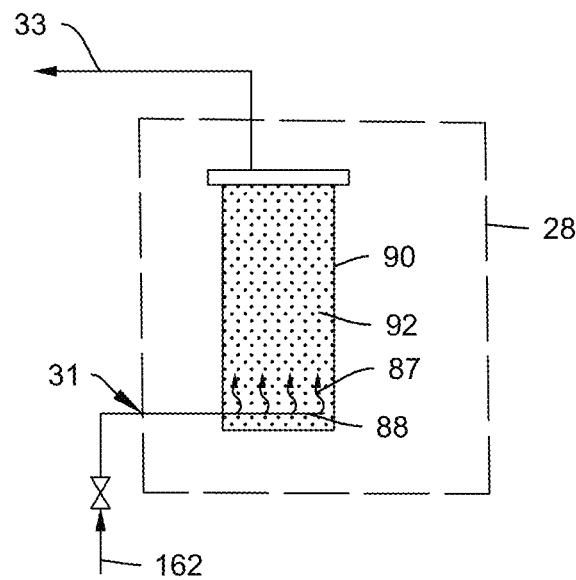
FIG. 26 is schematic representation of another embodiment of a polishing process incorporated into the biogas treatment system of FIG. 6.

With reference also to FIGS. 25 and 26, two exemplary polishing processes 28 are illustrated. In FIG. 25, the polishing process 28 uses a liquid polishing agent 82 which is a carbon dioxide (CO2) absorbent. According to one aspect of the invention, the polishing agent is an alkali material comprised of a hydroxide compound such as calcium hydroxide, sodium hydroxide, or potassium hydroxide. Optionally, the polishing agent may be an oxide compound such as calcium oxide. For purposes of discussion calcium hydroxide will be discussed in the form of a liquid polishing agent 82, however, this is not intended to be limiting. The calcium hydroxide is introduced into a first holding tank 80. The calcium hydroxide may be delivered directly to the first holding tank 80 in a liquid form as a mixture or solution. Optionally, the calcium hydroxide may be first introduced into the holding tank 80 in a solid form, for example, as powder and water, or other suitable liquid carrier, also introduced into the holding tank 80. A mixer may be used to combine the granules and the water into a solution suitable for delivery to the polishing tank 85. The liquid calcium hydroxide 82 is then delivered to an inlet 83 on the polishing tank 85.

Within the polishing tank 85, the polishing agent interacts with the purified biogas stream 162 to further remove any CO2 remaining in the biogas. The purified biogas stream 162 is delivered from the absorption riser 110 to the polishing tank 85 via a second inlet 31. Within the polishing tank 85 a perforated pipe 88 may be used to distribute biogas 87 throughout the polishing tank 85. Optionally, other distribution methods such as a nozzle or mixing element may be located within the polishing tank 85 to distribute the biogas 87. The biogas 87 interacts with the calcium hydroxide, Ca(OH)2, to remove CO2 remaining in the biogas 87. The calcium hydroxide, Ca(OH)2, interacts with the carbon dioxide (CO2) to generate calcium carbonate, CaCO3, and water, H2O, forming a slurry 89 that settles to the bottom of the polishing tank 85. Further refined biogas 87 rises to the top of the polishing tank 85 and exits via an outlet 33 to storage or to a dryer 27, if present.

In FIG. 26, the polishing process 28 uses a solid polishing agent 92. Similar to the liquid polishing agent 82, the solid polishing agent is a hydroxide compound such as calcium hydroxide, sodium hydroxide, or potassium hydroxide. For purposes of discussion calcium hydroxide will again be discussed as the solid polishing agent 92, however, this is not intended to be limiting. A cannister 90 is provided in which the solid polishing agent 92 is located. It is contemplated that the cannister 90 and solid polishing agent 92 may be provided in combination as a replaceable unit, where the cannister 90 is changed out after a predefined volume of biogas 87 has passed through the cannister 90. Optionally, the cannister 90 may be a fixture in the treatment system and the solid polishing agent 92 may be removed and replaced within the cannister 90 after a predefined volume of biogas 87 has passed through the cannister 90. The purified biogas stream 162 is delivered from the absorption risers 110 to an inlet 31 on the cannister 90. Within the cannister 90 a perforated pipe 88 may be used to distribute biogas 87 throughout the cannister 90. Optionally, other distribution methods such as a nozzle or mixing element may be located within the canister 90 to distribute the biogas 87. The calcium hydroxide 92 is provided in a granular form, allowing the biogas 87 to flow through the solid polishing agent 92. In a manner similar to that discussed above with the liquid polishing agent 82, the biogas 87 interacts with the solid polishing agent 92, calcium hydroxide Ca(OH)2, to remove CO2 remaining in the biogas 87. The calcium hydroxide, Ca(OH)2, interacts with the carbon dioxide (CO2) in the biogas 87 to generate calcium carbonate, CaCO3, and water, H2O, forming a slurry 89 that falls to the bottom of the cannister 90.

After a predefined volume of biogas 87 has passed through the cannister 90, the ability of the calcium hydroxide to further react with the CO2 in the biogas 87 will be depleted and the slurry in the cannister 90 will need to be cleaned out. As previously indicated, the cannister 90 and solid polishing agent 92 may be provided as a unit and the depleted cannister 90 with the slurry may be removed and a new cannister 90 and solid polishing agent 92 may be inserted. Optionally, the cannister 90 may have one or more openings by which the slurry may be removed and new solid polishing agent 92 introduced into the cannister 90 for further polishing of the purified biogas stream 162.

With the biogas treatment process 510 integrated into a water treatment system 500, the mixed water stream 166 from the last riser 100 in series connected risers or from each riser 100 in parallel connected risers, provides the source of the carbon dioxide water stream 518 for controlling the pH level of the disinfection process 520. The mixed water stream 166 may be supplied directly or first be discharged into a holding tank or other such water holding feature for subsequent discharge. An excess volume of mixed water 166, beyond that required for control of the pH level, may be discharged and the carbon dioxide allowed to dissipate naturally or to be aerated to facilitate the release of excess carbon dioxide.

In other applications, however, it may be desirable to recycle and reuse the water in which the carbon dioxide was dissolved. The water wash system may then include a flash process 200, an air stripper process 300, or a combination thereof. According to the illustrated embodiment in FIG. 6, both a flash process 200 and an air stripper process 300 are included. The mixed water stream 166 from the final absorption riser 110 is provided as an input to a flash riser 210 in the flash process 200. As will be discussed in more detail below, the flash riser 210 separates residual methane dissolved in the mixed water stream 166. The first outlet 260 is connected back to the initial processing stage 12 such that the methane extracted from the mixed water stream 166 may be recovered in subsequent processing and a carbon dioxide water stream is output from a second outlet 265 of the flash riser 210 to a second inlet 340 of an air stripping riser 310 in the carbon dioxide stripper process 300. A fan 75 discharges air into the first inlet 345 of the air stripping riser 310. As will be discussed in more detail below, the air stripping riser 310 separates the carbon dioxide from the water stream and the carbon dioxide is output from a first outlet 360. The reclaimed water may be used again within the water wash system and is pumped from the second outlet 365 of the air stripping riser 310 back to the holding tank 40.

Optionally, when the biogas treatment system 510 is integrated into the water treatment system 500 as shown in FIGS. 1-4, a flash process 200 may be provided to recover methane that may escape the absorber process 100 further purifying the mixed water stream 166 before it is used as the carbon dioxide water stream 518. A valve 590 regulated by the controller 570 may be used to divert a portion of the carbon dioxide water stream 518 to the stripper process 300, also shown as carbon dioxide aeration in FIG. 4. Excess carbon dioxide which is not required for regulating the pH level in the disinfection process 520 may be directed to the stripping riser 310 and separated from the water stream.

Figure 12:
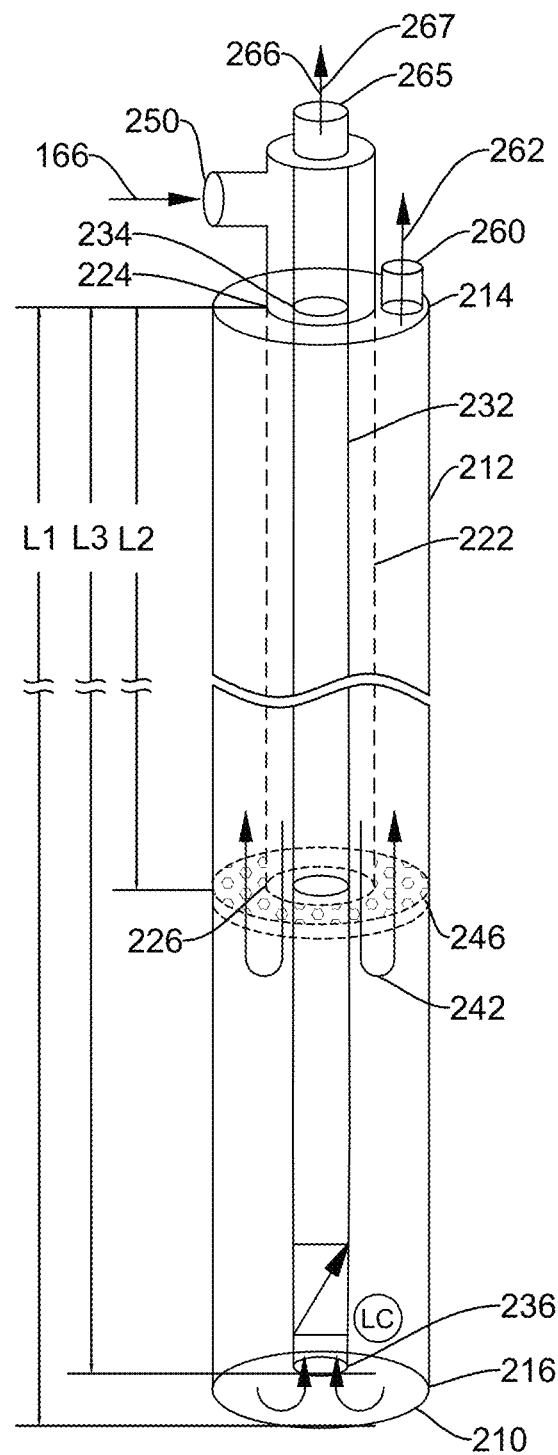
FIG. 12 is a front view of a flash riser from the biogas treatment system of FIG. 6.

Referring again to FIGS. 6 and 7, each of the illustrated systems includes both a flash riser 210 and an air stripper riser 310. With reference also to FIG. 12, an exemplary flash riser 210 is illustrated. During the absorption process, a small amount of methane may be absorbed into the water stream. This methane is referred to herein as the "slip gas." The flash riser 210 is configured to remove the slip gas from the mixed water stream 166 and return this methane to the supply for subsequent processing. The remaining water stream is passed on to the air stripping riser 310 where the carbon dioxide may be removed and the water reclaimed for subsequent use.

Each flash riser 210 includes multiple pipes. In the illustrated embodiment, the flash riser 210 includes an outer pipe 212, a first inner pipe 222, and a second inner pipe 232. According to the illustrated embodiment, each of the pipes is concentric to the others. Optionally, the first inner pipe 222 and the second inner pipe 232 may be positioned adjacent to each other or extend downward at different locations within the outer pipe 212. The outer pipe 212 has a first end 214, a second end 216, and a first length, L1. The first inner pipe 222 has a first end 224, a second end 226, and a second length, L2. The second inner pipe 232 has a first end 234, a second end 236, and a third length, L3. According to one embodiment of the invention, each of the flash risers 210 are installed in a vertical orientation, such that the first ends 214, 224, 234 of each pipe 212, 222, 232 are generally positioned at the top of each flash riser 210. The first inner pipe 222 extends for the second length, L2, into the outer pipe 212 and the mixed water stream 166 is delivered into the flash riser 210. According to the illustrated embodiment, the first inner pipe 222 is cylindrical and open at the second end 226. The mixed water stream 166 flows from the first inlet 250 and exits at the second end 226 of the first inner piper 222 The second inner pipe 232 extends for the third length, L3, through the first inner piper 222, beyond the second end 226 of the first inner pipe 222, and into the outer pipe 212. The second inner pipe 232 is cylindrical and the second end 236 of the second inner pipe 232 includes a check valve between the interior of the outer pipe 212 and the interior of the second inner pipe 232.

Each flash riser 210 includes an inlet and outlets to allow water and gas to flow into and out of the riser 210. A first inlet 250 receives the mixed water stream 166 and is located on the first end 214 of the outer pipe 212. The first inlet 250 is in fluid communication with the first end 224 of the first inner pipe 222 and establishes a flow path for the mixed water stream 166 into the flash riser 210. The first inner pipe 222 extends into the flash riser 210 for the length, L2, of the inner pipe 222. According to the illustrated embodiment, the second end 226 of the first inner pipe 222 terminates at a perforated coalescing disk 246 proximate the second end 216 of the first inner pipe 222. The mixed water stream 166 is dispensed into the flash riser 210 at the second end 226 of the first inner pipe 222. The pressure within the flash riser 210 is reduced such that the slip gas present in the mixed water stream 166 is desorbed and released within the outer pipe 212. The remaining water stream, however, continues to hold the carbon dioxide previously absorbed from the compressed biogas stream 30. The output water stream from the flash riser will be referred to herein as the CO2 water stream 266.

A first outlet 260 located at the first end 214 of the outer pipe 212 provides a flow path 261 for the slip gas 262 (i.e., the methane removed from the mixed water stream 166) to exit the flash riser 210. The first outlet 260 is in fluid communication with and receives the slip gas 262 from the interior of the outer pipe 212. A second outlet 265 is also located at the first end 214 of the outer pipe 212 and provides a flow path 267 for the CO2 water stream 266. The second outlet 265 is in fluid communication with the first end 234 of the second inner pipe 232. The CO2 water stream 266 enters the second end 236 of the second inner pipe 232 and travels up through the second inner pipe 232 to the second outlet 265. According to the illustrated embodiment, each of the outer pipe 212, first inner pipe 222, and second inner pipe 232 are concentric about a central axis. The second inner pipe 232 is located within the first inner pipe 222, which is, in turn, located within the outer pipe 212. As discussed above and for purposes of illustration in FIG. 12, the first end 214, 224, 234 of each pipe 212, 222, 232 ends at substantially the same point. It is contemplated that in various embodiments the first end 224, 234 of each of the first inner pipe 222 and the second inner pipe 232 may extend for a short distance beyond the first end 214 of the outer pipe 212 to facilitate connections between each pipe and an inlet or outlet. It is further contemplated that an inlet 250 or outlet 260, 265 may be positioned along and enter the outer pipe 212 via a side wall proximate the end of the flash riser 210. For example, the first inlet 250 is shown connecting generally orthogonally to a wall of the first inner pipe 222 beyond the first end 212 of the outer pipe and the second inner pipe 232 extends through an end wall of the first inner pipe 222 to connect to the second outlet 265. Alternately, the first inlet 250 or second outlet 265 may include a fixture connected to the first end 214 of the outer pipe 212 and comprise the necessary connections to establish the fluid flow paths from the inlet and outlet to the inner pipes extending into the outer pipe 212.

According to the illustrated embodiments in FIGS. 6-9, the carbon dioxide water stream 518 is shown being connected to the second outlet 265 of the flash riser 210. If a system does not include a flash riser, the carbon dioxide water stream 518 may be connected to the second outlet 165 of the absorption riser(s) 110.

Each air stripping riser 310 also includes multiple pipes. In the illustrated embodiment, the air stripping riser 310 includes an outer pipe 312, a first inner pipe 322, and a second inner pipe 332. According to the illustrated embodiment, each of the pipes is concentric to the others. Optionally, the first inner pipe 322 and the second inner pipe 332 may be positioned adjacent to each other or extend downward at different locations within the outer pipe 312. The outer pipe 312 has a first end 314 and a second end 316. The first inner pipe 322 has a first end 324 and a second end 326. The second inner pipe 332 has a first end 334 and a second end 336. According to one embodiment of the invention, each of the air stripping riser 310 are installed in a vertical orientation, with the first end 314 of the outside pipe positioned at the top of the air stripping riser 310. The first ends 324, 334 of each inner pipe 322, 332 are generally positioned at a flange 311 located within the air stripping riser 310. When the air stripping riser 310 is used in conjunction with the absorption risers 110 and/or the flash riser 210, it is contemplated that the flange 311 on the air stripping riser 310 is located at the same height as the first end of the absorption riser 110 and/or flash riser 210. The first inner pipe 322 extends downward for a length into the outer pipe 312. The first inner pipe 322 receives an air flow 70 from a fan 75 at a first inlet 345 and delivers the air flow 70 proximate the bottom of the air stripping riser 310 but above a level at which water may be present in the bottom of the air stripping riser 310. According to the illustrated embodiment, the first inner pipe 322 is cylindrical and open at the second end 326. The air flow 70 is passed from the first inlet 345 and exits at the second end 326 of the first inner piper 322. The second inner pipe 332 extends through the first inner piper 322, beyond the second end 326 of the first inner pipe 322, and into the outer pipe 312. The second inner pipe 332 is cylindrical and the second end 336 of the second inner pipe 332 includes a check valve between the interior of the outer pipe 312 and the interior of the second inner pipe 332.

Each air stripping riser 310 includes a set of inlets and outlets to allow water and gas to flow into and out of the riser 310. A second inlet 340 of the air stripping riser 310 receives the CO2 water stream 266 from the flash riser 210. Optionally, if no flash riser 210 present, the second inlet 340 of the air stripping riser 310 may receive the mixed water stream 166 output from the absorption risers 110. The second inlet 340 is located proximate the top of the air stripping riser 310. According to the illustrated embodiment, a first intermediate pipe 341 and a second intermediate pipe 342 each extend from the second inlet 340 into the air stripping riser 310. The first intermediate pipe 341 extends upward and enters the air stripping riser 310 proximate the first end 314 of the outer pipe 312. The second intermediate pipe 342 enters the air stripping riser 310 proximate the flange 311 and the first ends 324, 334 of the first and second inner pipes 322, 332. The first intermediate pipe 341 is in fluid communication with a first nozzle 343 that sprays the CO2 water stream 266 into the top of the air stripping riser 310 and the second intermediate pipe 342 is in fluid communication with a second nozzle 344 that sprays the CO2 water stream 266 into the air stripping riser 310 at a midpoint along the air stripping riser 310. The dual entry points for the CO2 water stream 266 define separate segments of the air stripping riser 310 that may then interact with the air flow 70 entering the air stripping riser 310 to remove the carbon dioxide from the CO2 water stream 266.

As previously indicated, air flow 70 is provided at the first inlet 345 and into the first inner pipe 322, establishing a flow path for the air flow 70 into the air stripping riser 310. The first inner pipe 322 extends into the air stripping riser 310 for a length and, according to the illustrated embodiment, the second end 326 of the first inner pipe 322 terminates at a dispersion element 349 proximate the second end 316 of the first inner pipe 322. The air flow 70 is dispensed into the air stripping riser 310 at the second end 326 of the first inner pipe 322 as illustrated by the air flow path 367. The pressure within the air stripping riser 310 is further reduced from the flash riser 210 and is preferably maintained at or near atmospheric pressure. The reduction in pressure reduces the solubility of carbon dioxide in water facilitating the release of the carbon dioxide from the CO2 water stream 266 within the outer pipe 312. The air flow 70 is pumped into the bottom of the air stripping riser 310 such that the air flow 70 rises counter to the CO2 water stream 266 being sprayed into the top of the riser 310. The air flow 70 interacts with water droplets to facilitate release of the carbon dioxide and further carries the carbon dioxide toward the top of the air stripping riser 310.

A first outlet 360 located at the first end 314 of the outer pipe 312 provides a flow path 361 for the carbon dioxide 362 removed from the CO2 water stream 266 to exit the air stripping riser 310. The first outlet 360 is in fluid communication with and receives the carbon dioxide 362 from the interior of the outer pipe 312. A second outlet 365 is located proximate the first end 324 of the second inner pipe 232. As illustrated, the second inner pipe 332 is connected to a ninety degree bend pipe 337 and to a short outlet pipe 338 such that it extends out the side of the outer pipe 312. The second outlet 365 provides a flow path 367 for the reclaimed water stream 366. The second outlet 365 is in fluid communication with the first end 334 of the second inner pipe 332. The reclaimed water stream 366 enters the second end 336 of the second inner pipe 332 and travels up through the second inner pipe 332 to the second outlet 365. According to the illustrated embodiment, each of the outer pipe 312, first inner pipe 322, and second inner pipe 332 are concentric about a central axis. The second inner pipe 332 is located within the first inner pipe 322, which is, in turn, located within the outer pipe 312. The first end 324, 334 of each inner pipe 322, 332 ends proximate the flange 311 located within the outer pipe 312. The first inlet 345 and the second outlet 365 are connected to the first inner pipe 322 and the second inner pipe 332, respectively, and extend out through a wall of the outer pipe 312. Although the first end 314 of the outer pipe 312 extends for some distance beyond the flange 311, it is contemplated that in various embodiments the second inlet 340 may run directly into the outer pipe with a single intermediate pipe and the first end 314 of the outer pipe 312 may be positioned proximate the flange 311. Optionally, the first end 224, 234 of each of the first inner pipe 222 and the second inner pipe 232 may extend up to or for a short distance beyond the first end 314 of the outer pipe 312 without deviating from the scope of the invention.

Figure 13:
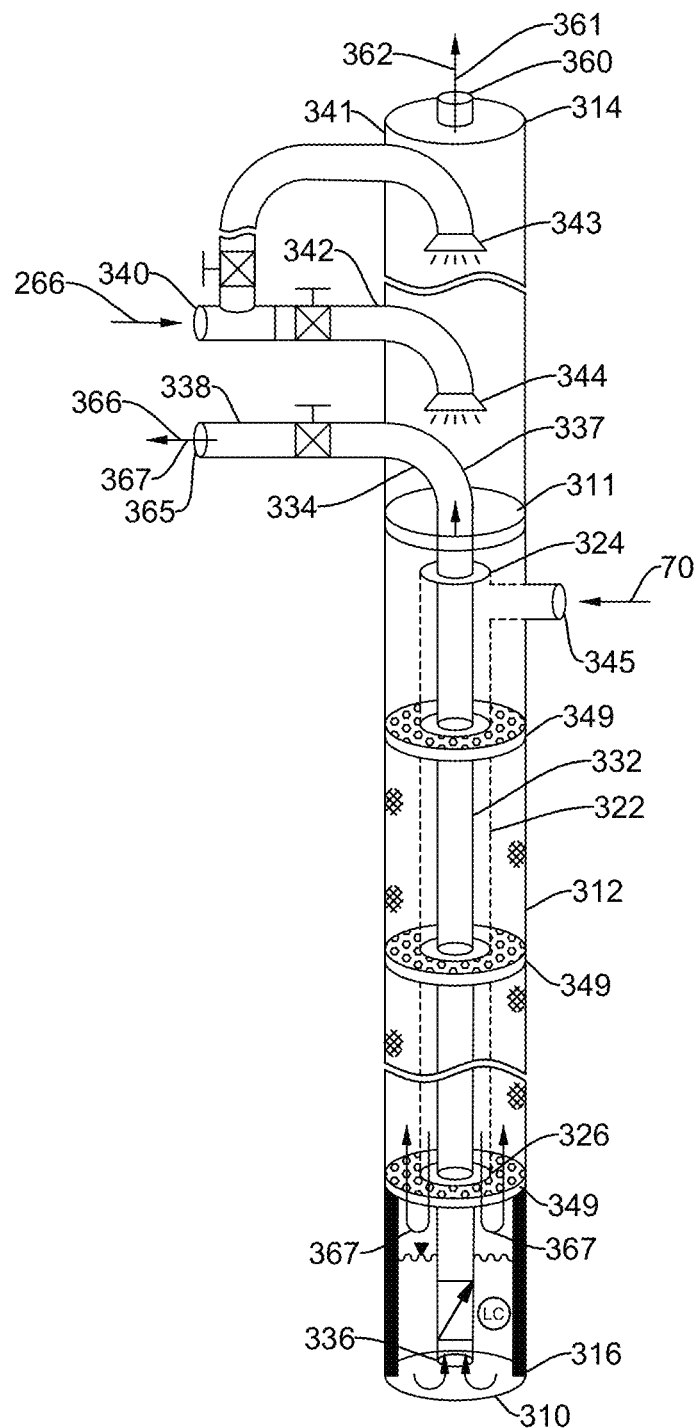
FIG. 13 is a front view of an air stripping riser from the biogas treatment system of FIG. 1.

It is further contemplated that each air stripping riser 310 may include packing material within at least a portion of the interior of the outer pipe 312 to further enhance the release of the carbon dioxide from the CO2 water stream 266. In FIG. 13, additional dispersion plates 349 are shown spaced apart within the outer pipe 312. One or more additional dispersion plates may be distributed along the length of the interior of the outer pipe 312 to continually redistribute the air flow 70 and CO2 water stream 266 as they travel through the interior of the pipe. It is also contemplated that packing material similar to that used in the absorption riser 110 may be inserted into the air stripping riser 310. With reference again to FIGS. 14 and 15, a flexible, porous material 170 may be rolled into a coil and inserted between the inner periphery of the outer pipe and the outer periphery of the first inner pipe. According to one embodiment of the invention, the flexible material 170 is a netting material, such as a geonet, including multiple holes throughout the material. As the CO2 water stream 266 passes through the air stripping riser 310, the netting and the multiple holes create numerous flow paths and opportunities for separating the CO2 water stream 266 into more droplets and, thereby, increasing the surface area of the water stream exposed to the air, facilitating release of the carbon dioxide into the air. In FIG. 15, a mesh material 180 may be formed into a basket or bag and is used to contain another bulk material 182 within the mesh. The mesh and bulk materials 180, 182 may be inserted into and removed from the interior of the outer pipe as a unit. Both the flexible material 170 and the mesh and bulk material combination 180, 182 facilitate cleaning of the packing material. The flexible material 170 may be removed and unrolled for cleaning. The mesh and bulk material 180, 182 may be pulled out of the outer pipe and the bulk material spread out for cleaning. Once clean, the flexible material 170 may be rolled back into a coil and inserted back into the outer pipe. Similarly, the bulk material 182 may be placed back into the mesh material 180 and inserted into the outer pipe.

According to still another embodiment of the invention the diameter and/or length of an absorption riser 110 may make the insertion of a material within the absorption riser challenging. Therefore, it is contemplated that the packing material may be a porous structure or material that is poured, blown, or pumped into the absorption riser 110. Initially, a mesh filter or grate may be inserted at a particular depth or length within the absorption riser to prevent the porous structure or material from passing beyond a certain point within the absorption riser 110. The filter or grate has openings of a smaller size than the size of individual members of the packing material, such that the packing material is stopped by the filter or grate while allowing the biogas and water streams flow through and around the packing material and filter or grate. It is further contemplated that the filter or grate may be connected to a cable or rod to facilitate cleaning or maintenance on the absorption riser. The cable or rod may have mixing devices attached or it may be used to pull the filter or grate out of the absorption riser 110 which, in turn, would pull out the packing material, allowing the packing material and/or the interior of the absorption riser to be inspected or maintained.

The carbon dioxide 362 extracted from the CO2 water stream 266 in the air stripping riser 310 may be vented directly from the first outlet 360 into the atmosphere. However, the potential exists that the carbon dioxide 362 stream may also include other contaminants. Therefore, it may be desirable to discharge the carbon dioxide 362 into the environment in another manner such that further processing may be performed on the carbon dioxide stream 362. Referring next to FIGS. 17-19, three exemplary off-gas discharge methods are illustrated. In FIG. 17, the carbon dioxide 362 is carried through a discharge pipe 400 into a bio-filter material 405. The bio-filter material is mounded above the ground 410 and the discharge pipe 400 is perforated along the length extending into the bio-filter material. The carbon dioxide 362 is vented into the bio-filter material as shown by the arrows 420. In FIG. 18, the carbon dioxide 362 is carried through a discharge pipe 400 for some distance above the ground 410 and is then buried below the ground 410. The discharge pipe 400 is perforated along the length extending below the ground, and the carbon dioxide 362 is vented into the ground as shown by the arrows 420. In FIG. 19, the carbon dioxide 362 is carried through a discharge pipe 400 into a water reservoir 415 formed in the ground 410. The water reservoir 415 may be naturally occurring such as a pond or lake or may be constructed by digging an area dug out of the ground 410. The discharge pipe 400 is perforated along the length extending under the water, and the carbon dioxide 362 is vented into the water reservoir as shown by the arrows 420. According to still another embodiment of the invention, it may be desirable to provide a thermal oxidization unit and the carbon dioxide 362 and other trace constituents may pass through the thermal oxidization unit prior to release into the atmosphere. Any of the exemplary off-gas discharge methods may be utilized to regulate a level of carbon dioxide available for adjusting the pH level of the disinfection process 520. The controller 570 receives inputs from sensors corresponding to operating conditions within the water treatment process, such as pressure, temperature, pH levels, flow rates, and the like and supplies the appropriate carbon dioxide water stream 518 to achieve a desired pH level in the second basin 540.

Figure 8:
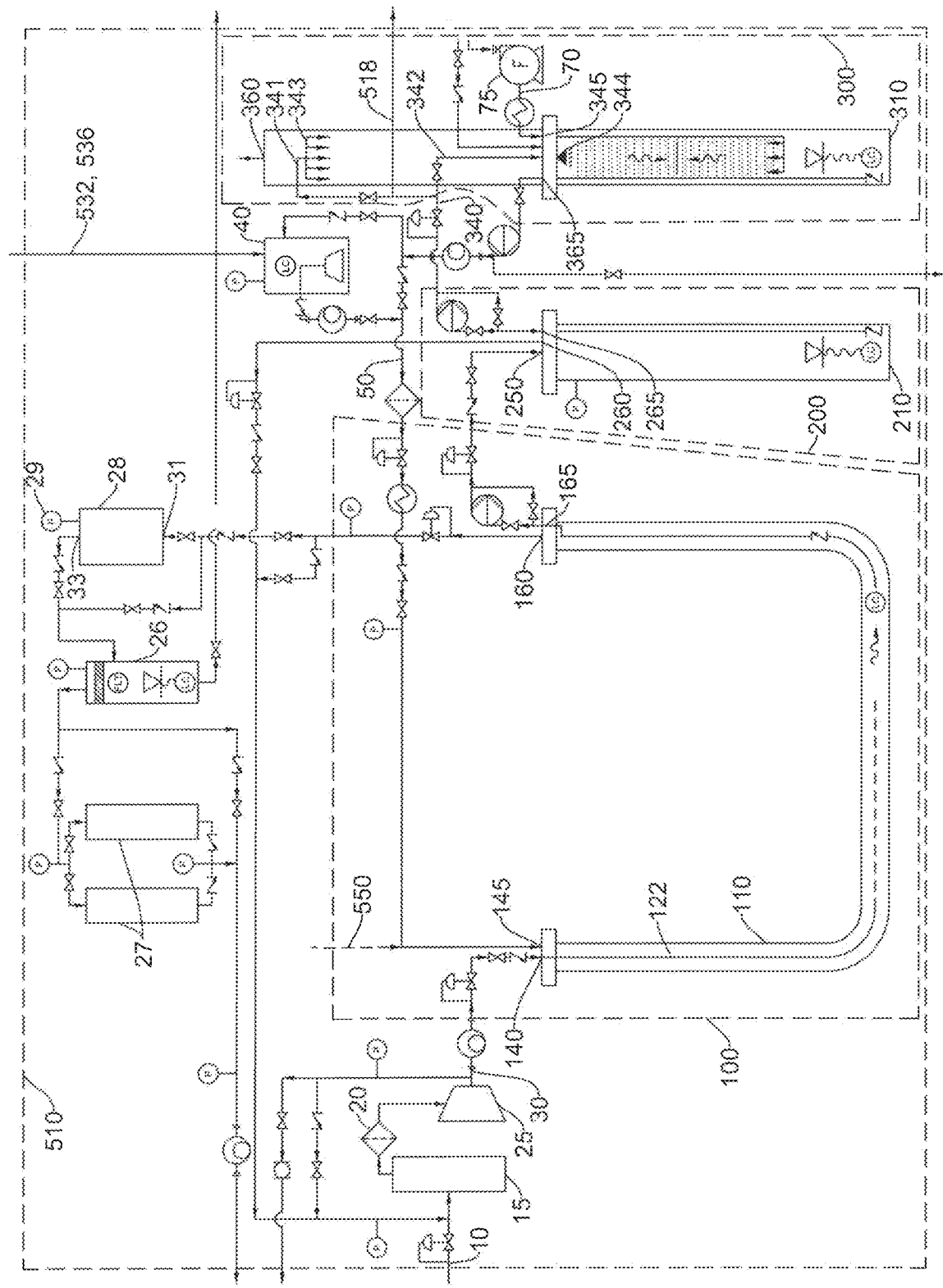
FIG. 8 is a schematic representation of an exemplary biogas treatment system incorporating another embodiment of the present invention.
Figure 9:
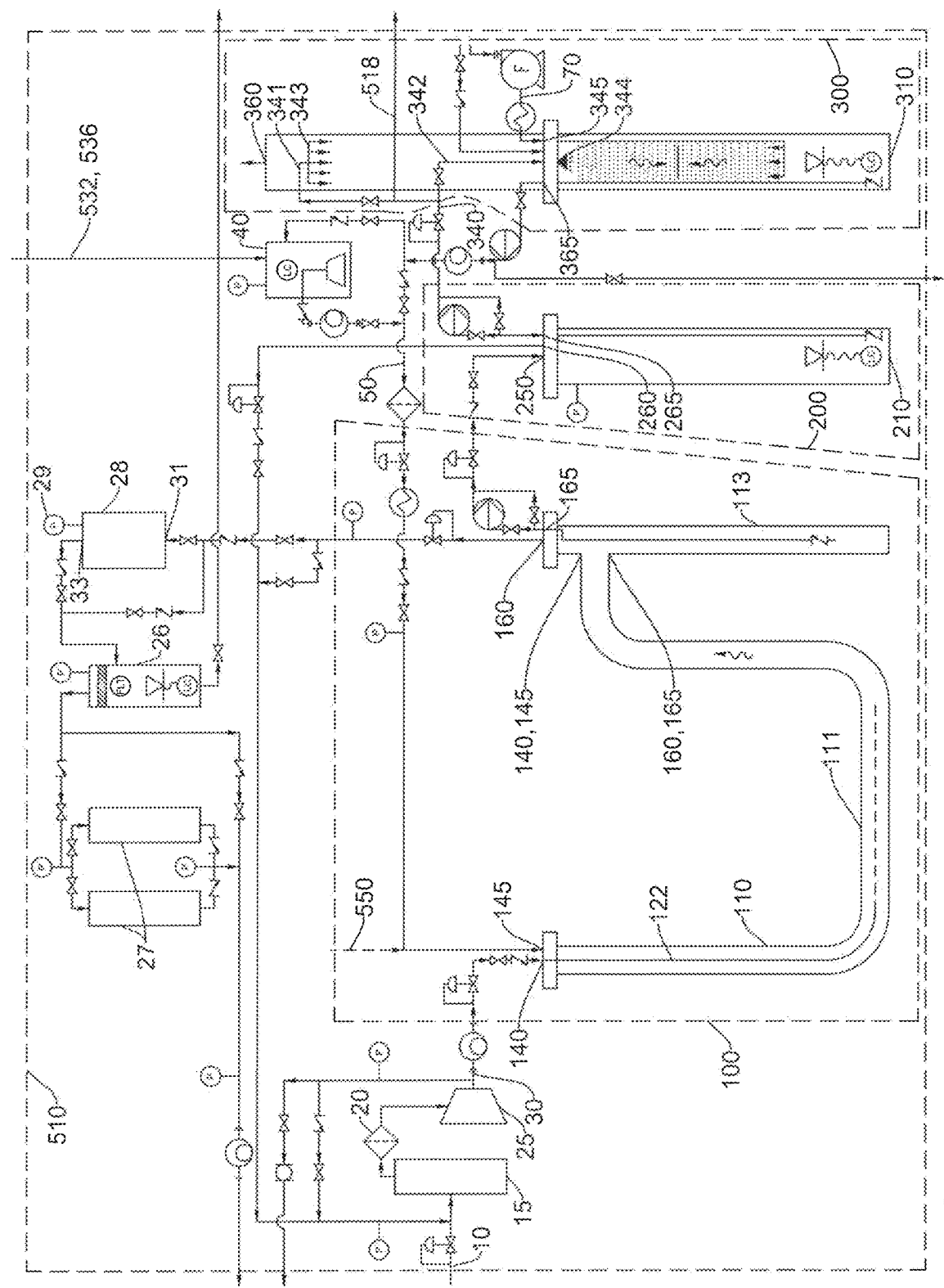
FIG. 9 is a schematic representation of an exemplary biogas treatment system incorporating another embodiment of the present invention.

Referring next to FIGS. 8 and 9, an exemplary biogas treatment system incorporating another embodiment of the present invention is illustrated. As discussed above with respect to FIG. 6, a biogas stream 10 is provided as an input to the system, where the biogas may be produced, for example, from an anaerobic decomposition process. Some initial processing of the biogas stream may occur prior to supplying the biogas stream to the water wash system. An optional hydrogen sulfide removal process 15 such as an iron sponge type system may be inserted in series with the biogas stream 10 to perform an initial removal of hydrogen sulfide present in the biogas stream. The biogas stream may also be passed through a filter 20 to remove particulate content. In addition, carbon dioxide has increased solubility characteristics with decreasing temperature and increasing pressure. The biogas stream is, therefore, passed through a compressor 25 to achieve an elevated pressure. The pressure range of the compressed biogas stream 30 may be between ten and two hundred pounds per square inch gauge (10-200 psig). According to one embodiment of the invention, the pressure range of the compressed gas is between about sixty and one hundred fifty pounds per square inch gauge (60-150 psig). The compressed biogas may also be chilled, for example, to between thirty-five and sixty-eight degrees Fahrenheit (35-68° F.). The compressed and/or chilled biogas stream 30 is provided as an input to the water wash process.

Similar to the embodiment illustrated in FIGS. 6 and 7, the water wash process illustrated in FIG. 8 utilizes water to remove the carbon dioxide from the biogas stream. In the embodiments illustrated in FIGS. 6 and 7, however, the water and biogas streams flow in opposite directions (i.e., counter-current) to each other through the absorption risers 110. In the embodiments illustrated in FIGS. 8 and 9, the water and biogas streams flow in the same direction (i.e. concurrent) to each other through an absorption riser 110. According to the illustrated embodiment, water is provided to a holding tank 40 from which a water stream 50 is provided to the water wash process. Water provided to the holding tank 40 may be chilled and/or under pressure to facilitate the water wash process. Optionally, the holding tank 40 may incorporate a chiller and/or a compressor to chill or pressurize the water prior to supplying it in the water stream. The water, for example, may be chilled to between thirty-five and sixty-eight degrees Fahrenheit (35-68° F.) and pressurized to mix with the compressed biogas stream 30 at about the same input pressure of the biogas stream.

Figure 23:
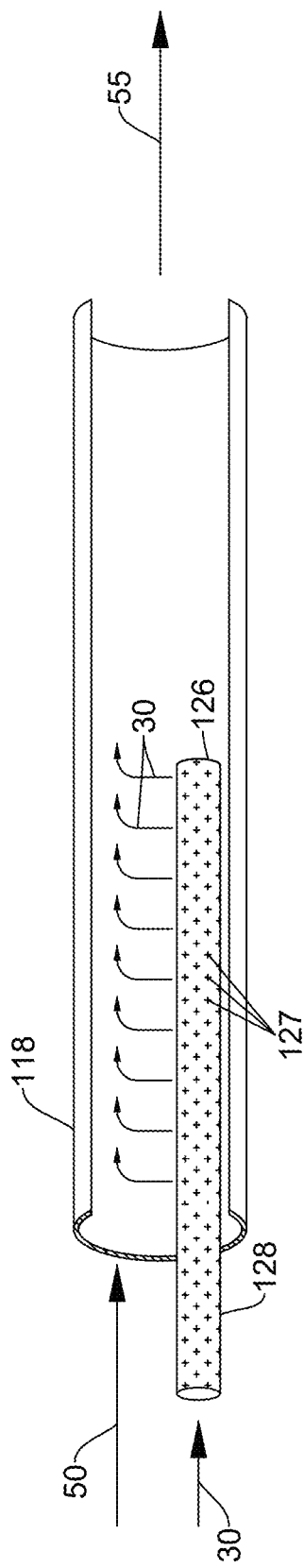
FIG. 23 is a partial sectional view of the horizontal absorption riser of FIG. 20 according to one embodiment of the invention.

In the biogas treatment system of FIG. 8, a single absorption riser 110 is provided. Referring also to FIG. 23, the absorption riser 110 includes multiple pipes. In the illustrated embodiment, the absorption riser 110 includes an outer pipe 112, a first inner pipe 122, and a second inner pipe 132. According to the illustrated embodiment, each of the inner pipes 122, 132 is concentric to the outer pipe 112. Optionally, the inner pipes 122, 132 may be positioned at different locations (e.g., along the interior wall) within the outer pipe 112. The outer pipe 112 has a first end 114 and a second end 116. The first inner pipe 122 has a first end 124 and a second end 126. The second inner pipe 132 has a first end 134 and a second end 136. The outer pipe 112 also includes a first segment 117, a second segment 118, and a third segment 119. It is contemplated that the absorption riser 110 may be buried within the ground or submerged below water. Optionally, the outer pipe 112 and the inner pipes may be formed of a flexible material and may extend in one or more rows or be coiled up and placed, for example, on the ground in a substantially horizontal configuration.

If the pipes are buried or submerged, the first segment 117 extends downward where the first end 114 of the outer pipe 112 may be located at a surface level. The first inner pipe 122 is located within the first segment 117, where the first end 124 of the first inner pipe 122 is generally positioned at the first end 114 of the outer pipe 112. The second segment 118 extends generally in a horizontal direction, and the first inner pipe 122 also includes a horizontal segment 128 that extends, at least for a portion of the horizontal direction, within the outer pipe 112. The horizontal segment 128 includes a plurality of perforations 127 located along the length of the horizontal segment 128 from which the compressed biogas stream 30 may be released into the water flowing through the outer pipe. It is contemplated that the perforations 127 may also be located along the descending portion of the inner pipe 122 within the first segment 117 of the outer pipe 112. The third segment 119 extends upward back to the surface level. The second inner pipe 132 is located within the third segment 119 of the outer pipe 112. The second inner pipe 132 is cylindrical and the second end 136 of the second inner pipe 132 is located proximate the transition between the second segment 118 and the third segment 119 of the outer pipe 112. The first end 134 of the second inner pipe 132 is located proximate the second end of the outer pipe. The second end 136 of the second inner pipe 132 includes a check valve between the interior of the outer pipe 112 and the interior of the second inner pipe 132, where the check valve is controlled to allow the mixed water stream to enter the second inner pipe 132 and be drawn up and out of the absorption riser 110 through the second inner pipe.

If the pipes are laid out in rows or coiled up and placed on the ground, the first segment 117 extends for a portion of the absorption riser 110 and the first end 114 of the outer pipe 112 is located at a first end of the absorption riser 110. The first inner pipe 122 is located within the first segment 117, where the first end 124 of the first inner pipe 122 is generally positioned at the first end 114 of the outer pipe 112. The second segment 118 extends for a second portion of the absorption riser 110, and the first inner pipe 122 also extends at least for a portion of the second segment 118. The first inner pipe 122 includes a plurality of perforations 127 located along the length of the first inner pipe within the second segment 118 from which the compressed biogas stream 30 may be released into the water flowing through the outer pipe 112. The third segment 119 extends for a third portion of the outer pipe 112, and the second inner pipe 132 is located within the third segment 119 of the outer pipe 112. The second inner pipe 132 is cylindrical and the second end 136 of the second inner pipe 132 is located proximate the transition between the second segment 118 and the third segment 119 of the outer pipe 112. The first end 134 of the second inner pipe 132 is located proximate the second end of the outer pipe. The second end 136 of the second inner pipe 132 includes a check valve between the interior of the outer pipe 112 and the interior of the second inner pipe 132, where the check valve allows the mixed water stream to flow in one direction to enter the second inner pipe 132 and be drawn up and out of the absorption riser 110 through the second inner pipe.

In the biogas treatment system of FIG. 9, the single absorption riser 110 of FIG. 8 may be divided into two portions, where a first portion 111 includes the first segment 117 and the second segment 118 of the absorption riser 110 as discussed above with respect to FIG. 8. The second portion 113 includes the third segment 119 of the absorption riser 110 as discussed above with respect to FIG. 8. Referring also to FIG. 22, the absorption riser 110 includes multiple pipes. In the illustrated embodiment, the absorption riser 110 includes an outer pipe 112, a first inner pipe 122, and a second inner pipe 132. According to the illustrated embodiment, each of the inner pipes 122, 132 is concentric to the outer pipe 112. Optionally, the inner pipes 122, 132 may be positioned at different locations (e.g., along the interior wall) within the outer pipe 112. The outer pipe 112 is divided into two lengths, where the first length 112A of the outer pipe has a first end 114A and a second end 116B. The outer pipe 112 also includes a first segment 117 and a second segment 118 extending within the first length 112A of the outer pipe 112. A third segment 119 extends for the second length 112B of the outer pipe 112. The first inner pipe 122 has a first end 124 and a second end 126, where the first end 124 is proximate the first end 114A of the first length 112A of the outer pipe. It is contemplated that the absorption riser 110 may be buried within the ground or submerged below water. Optionally, the outer pipe 112 and the inner pipes may be formed of a flexible material and may extend in one or more rows or be coiled up and placed, for example, on the ground in a substantially horizontal configuration.

If the pipes are buried or submerged, the first segment 117 extends downward where the first end 114A of the first length 112A of the outer pipe 112 may be located at a surface level. The first inner pipe 122 is located within the first segment 117, where the first end 124 of the first inner pipe 122 is generally positioned at the first end 114A of the first length 112A of the outer pipe 112. The second segment 118 extends generally in a horizontal direction, and the first inner pipe 122 also includes a horizontal segment 128 that extends, at least for a portion of the horizontal direction, within the outer pipe 112. The horizontal segment 128 includes a plurality of perforations 127 located along the length of the horizontal segment 128 from which the compressed biogas stream 30 may be released into the water flowing through the outer pipe. It is contemplated that the perforations 127 may also be located along the descending portion of the inner pipe 122 within the first segment 117 of the outer pipe 112. Optionally, a series of nozzles or other gas injectors may be located along the length of the inner pipe 122, where each nozzle disperses a portion of the biogas stream within the outer pipe 112. According to still another option, multiple inner pipes 122 may be provided, where each inner pipe 122 includes a series of perforations 127 or nozzles spaced along the length of each inner pipe 122 to facilitate dispersion of the biogas stream 30 throughout the interior of the outer pipe 112. The second segment 118 may further include a rising section, where at least the first length 112A of the outer pipe and, optionally, the inner pipe 122 extend for a distance back toward the surface level.

If the pipes are laid out in rows or coiled up and placed on the ground, the first segment 117 extends for a portion of the absorption riser 110 and the first end 114A of the outer pipe 112 is located at a first end of the absorption riser 110. The first inner pipe 122 is located within the first segment 117, where the first end 124 of the first inner pipe 122 is generally positioned at the first end 114 of the outer pipe 112. The second segment 118 extends for a second portion of the absorption riser 110, and the first inner pipe 122 also extends at least for a portion of the second segment 118. The first inner pipe 122 includes a plurality of perforations 127 located along the length of the first inner pipe within the second segment 118 from which the compressed biogas stream 30 may be released into the water flowing through the outer pipe 112. It is contemplated that the perforations 127 may also be located along the portion of the inner pipe 122 within the first segment 117 of the outer pipe 112. The third segment 119 extends for a third portion of the outer pipe 112, and the second inner pipe 132 is located within the third segment 119 of the outer pipe 112. According to one embodiment, the first and second segments 117, 118 defining the first length 112A of the outer pipe 112 may be located generally horizontally, for example, on the ground and the second length 112B of the outer pipe 112 may extend vertically, for example, buried or submerged below a surface level of ground or water.

The second length 112B of the outer pipe 112 defines a substantially vertical pipe having a first end 114B and a second end 116B. The second end 116A of the first length 112A of the outer pipe is connected proximate the first end 114B of the second length 112B of the outer pipe. The second inner pipe 132 is located within the third segment 119 of the outer pipe 112, which corresponds to the second length 112B of the outer pipe. The second inner pipe 132 has a first end 134 and a second end 136. The second inner pipe 132 is cylindrical and the second end 136 of the second inner pipe 132 is located proximate the second end 116B of the second length 112B of the outer pipe. The first end 134 of the second inner pipe 132 is located proximate the first end 114B of the second length 112B of the outer pipe. The second end 136 of the second inner pipe 132 includes a check valve between the interior of the second length 112B of the outer pipe 112 and the interior of the second inner pipe 132, where the check valve allows the mixed water stream to flow in one direction to enter the second inner pipe 132 and be drawn up and out of the absorption riser 110 through the second inner pipe.

With reference again to FIGS. 8-9 and 20-22, the absorption riser 110 includes a set of inlets and outlets to allow water and biogas to flow into and out of the riser 110. A first inlet 140 receives the compressed biogas stream 30 and is located on the first end 114 of the outer pipe 112. The first inlet 140 is in fluid communication with the first end 124 of the first inner pipe 122 and establishes a flow path for the compressed biogas stream 30 into the absorption riser 110. As previously indicated, the first inner pipe 122 extends into through the first segment 117 and into the second segment 118 of the outer pipe 112, and the second end 126 of the first inner pipe 122. A second inlet 145 receives the water stream 50 and is located on the first end 114 of the outer pipe 112. The second inlet 145 is in fluid communication with the first end 114 of the outer pipe 112 to dispense the water stream 50 from the first end of the absorption riser 110. The water stream 50 flows through to the second end of the absorption riser. The compressed biogas stream 30 is dispensed into the water flow from the perforations 127 in the first inner pipe 122 and flows toward the second end of the absorption riser.

As the compressed biogas stream 30 and the water stream 50 flow along the horizontal portion of the absorption riser 110 the two streams mix and the carbon dioxide within the compressed biogas stream 30 is dissolved into the water. Although small amounts of methane may be absorbed in the water, the majority of the methane remains unabsorbed. The methane is lighter than the mixed water stream containing carbon dioxide. With reference to FIGS. 8 and 20, the methane rises to the second end 116 of the absorption riser 110. The mixed water stream 166 including the carbon dioxide absorbed from the biogas stream is heavier than the methane and remains at the end of the horizontal segment of the absorption riser at the transition to the upward segment. A first outlet 160 located at the second end 116 of the outer pipe 112 provides a flow path 161 for the purified biogas stream 162 to exit the absorption riser 110. The first outlet 160 is in fluid communication with and receives the purified biogas stream 162 from the interior of the outer pipe 112. With reference to FIGS. 9 and 22, the flow in the first length 112A of the outer pipe created by the water stream 50 and the biogas stream 30 establish a flow through the first length 112A of the outer pipe 112 and into the second length 112B of the outer pipe. The mixed water stream then falls to the second end 116B of the second length 112B of the outer pipe and the methane rises to the first end 114B of the second length 112B of the outer pipe. A first outlet 160 located at the first end 114B of the second length 112B of the outer pipe 112 provides a flow path 161 for the purified biogas stream 162 to exit the absorption riser 110. The first outlet 160 is in fluid communication with and receives the purified biogas stream 162 from the interior of the outer pipe 112. A second outlet 165 is also located proximate the first outlet 160 and provides a flow path 167 for the mixed water stream 166. The second outlet 165 is in fluid communication with the first end 134 of the second inner pipe 132. The mixed water stream 166 enters the second end 136 of the second inner pipe 132 and travels up through the second inner pipe 132 to the second outlet 165. As discussed above and for purposes of illustration in FIG. 9, the first ends 114, 124, of the outer pipe 112 and the first inner pipe 122 end at substantially the same point. Similarly, the first end 134 of the second inner pipe 132 and the second end 116 of the outer pipe 112 end at substantially the same point. It is contemplated that in various embodiments the first end 124, 134 of each of the first inner pipe 122 and the second inner pipe 132 may extend for a short distance beyond either end of the outer pipe 112 to facilitate connections between each pipe and an inlet or outlet.

Because the interaction of the water stream and the biogas stream is reduced when the streams are travelling in the same direction rather than travelling in opposite directions, transfer of carbon dioxide from the compressed biogas stream 30 to the water stream 50 occurs at a reduced rate per length of travel. Thus, the embodiment illustrated in FIG. 8 is better suited for applications in which a lengthy horizontal segment of the absorption riser is available. It is contemplated that each pipe of the absorption riser may be formed of a flexible material and coiled or laid out in rows alternating back and forth adjacent to each other. According to one embodiment, the absorption riser may extend along the ground in a generally horizontal orientation. According to another embodiment, the absorption riser 110 may be routed into a pond, lake, or other available water source. The water may provide some protection and/or insulation for the absorption riser 110. The absorption riser may extend in numerous configurations, such as a straight line, a curved path, an alternating back-and-forth route, or a combination thereof to increase the length of the horizontal segment. It is contemplated that the horizontal segment of the absorption riser 110 may extend for one hundred feet or longer before the absorption riser 110 transitions to the upward segment. Optionally, a portion, or all, of the absorption riser may include an external sleeve to provide further protection and/or insulation. The sleeve may further provide weight to the absorption riser 110 if it is installed in an underwater application to reduce buoyancy and to help keep the absorption riser 110 along the bottom of the pond, lake, or other water source.

To increase the interaction between the water stream 50 and the biogas stream 30, it is contemplated that one or more mixing elements may be included along the length of travel. The mixing elements may be powered, for example, a rotating member within the pipe, or preferably, may be passive mixing elements. The passive mixing elements are configured to disrupt a linear flow path through the pipes, causing the water stream 50 and the biogas stream 30 to intermix their flows along the length of the absorption riser.

Figure 24:
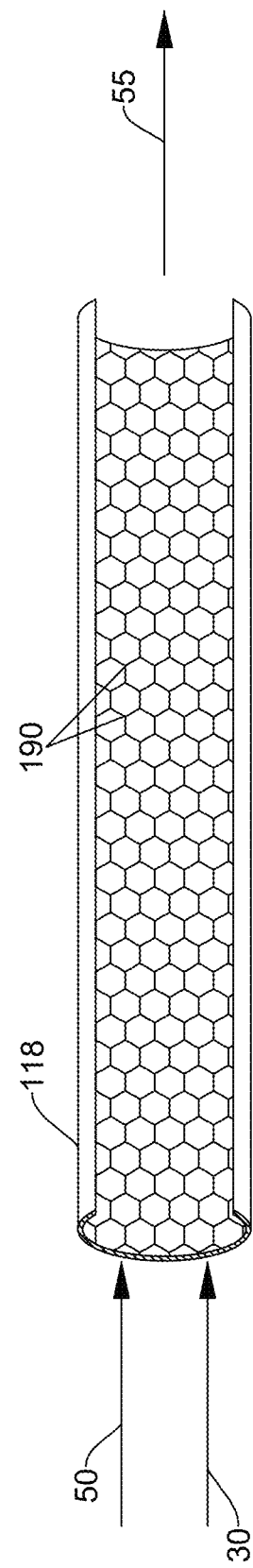
FIG. 24 is a partial sectional view of the horizontal absorption riser of FIG. 20 according to another embodiment of the invention.

With reference to FIGS. 20 and 22, it is contemplated that a dispersion plate 149 may be included within the outer pipe 112. The dispersion plate may be located proximate the inlets to disperse a flow across the interior of the absorption riser 110. Optionally, one or more dispersion plates 149 may be located beyond the second end 126 of the first inner pipe 122 to encourage mingling of the two flows. With reference also to FIGS. 23 and 24, the interior of the absorption riser 110 may have different configurations. In FIG. 23, the horizontal segment 128 of the inner pipe is illustrated with perforations 127 distributed around the pipe. The compressed biogas stream 30 escapes through the perforations 127 into the water stream 50 flowing in the same direction through the pipe. Optionally, and as shown in FIGS. 22 and 24, the horizontal segment 118 of the outer pipe 112 may include packing material 190 within at least a portion of the interior of the horizontal segment 118 to further enhance the release of the carbon dioxide from the water stream 50. The compressed biogas stream 30 may be discharged into the horizontal segment 118 in advance of the packing material 190 so that the compressed biogas stream 30 and the water stream 50 travel through the packing material 190 and, thereby increase contact between the two streams. A partially mixed stream 55 is illustrated as continuing on along the horizontal segment of the absorption riser 110. It is further contemplated that a combination of the two embodiments may be utilized in which the horizontal segment 128 of the inner pipe extends into a segment of the outer pipe 112 that has packing material 190 located therein.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

I claim:

1. A water treatment system, comprising:
   a process water supply;
   a carbon dioxide separation system configured to separate carbon dioxide from a biogas, the carbon dioxide separation system further comprising:
      an input to receive the biogas, wherein the biogas has a concentration of the carbon dioxide present in the biogas,
      a second input to receive a first portion of the process water supply,
      a chamber in which the first portion of the process water supply mixes with the biogas to remove the carbon dioxide from the biogas and to generate a carbon dioxide water stream, and
      an output providing the carbon dioxide water stream;
   a water reservoir, the water reservoir further comprising:
      a first input to receive a second portion of the process water supply,
      a second input to receive the carbon dioxide water stream, and
      a sensor configured to generate a signal corresponding to a pH level in the water reservoir; and
   a controller configured to receive the signal from the sensor and to control injection of the carbon dioxide water stream into the water reservoir as a function of the signal.

2. The water treatment system of claim 1, wherein the carbon dioxide separation system is selected from a group consisting of a water wash process, chemical absorption, pressure swing absorption, and membrane separation.

3. The water treatment system of claim 1, wherein the process water supply is generated by at least one other step in the water treatment system.

4. The water treatment system of claim 1, further comprising a flow control device at the output of the carbon dioxide separation system, wherein the controller controls operation of the flow control device to control injection of the carbon dioxide water stream into the water reservoir.

5. The water treatment system of claim 1, further comprising a second water reservoir, wherein the process water supply is output from the second water reservoir.

6. A water treatment system, comprising:
   a process water supply;
   a carbon dioxide separation system configured to separate carbon dioxide from a biogas, the carbon dioxide separation system further comprising:
      an input to receive the biogas, wherein the biogas has a concentration of the carbon dioxide present in the biogas,
      a second input to receive a first portion of the process water supply,
      a chamber in which the first portion of the process water supply mixes with the biogas to remove the carbon dioxide from the biogas and to generate a carbon dioxide water stream, and
      an output providing the carbon dioxide water stream;
   a water reservoir, the water reservoir further comprising:
      a first input to receive a second portion of the process water supply,
      a second input to receive the carbon dioxide water stream, and
      a sensor configured to generate a signal used to adjust a flow rate of the carbon dioxide water stream into the water reservoir; and
   a controller configured to receive the signal from the sensor and to control the flow rate of the carbon dioxide water stream into the water reservoir as a function of the signal.

7. The water treatment system of claim 6, further comprising a flow control device between at the output of the carbon dioxide separation system, wherein the controller controls operation of the flow control device to control the flow rate of the carbon dioxide stream.

8. The water treatment system of claim 6, wherein the sensor generates a signal corresponding to a pH level in the water reservoir.

9. The water treatment system of claim 6, wherein the sensor generates a signal corresponding to an oxidation reduction potential in the water reservoir.

10. The water treatment system of claim 6, wherein the carbon dioxide separation system is selected from a group consisting of a water wash process, chemical absorption, pressure swing absorption, and membrane separation.

11. The water treatment system of claim 6, wherein the process water supply is generated by at least one other step in the water treatment system.

12. The water treatment system of claim 6, further comprising a second water reservoir, wherein the process water supply is output from the second water reservoir.

13. A water treatment system, comprising:
a process water supply;
a carbon dioxide separation system configured to separate carbon dioxide from a biogas, the carbon dioxide separation system further comprising:
- an input to receive the biogas, wherein the biogas has a concentration of the carbon dioxide present in the biogas,
- a second input to receive a first portion of the process water supply,
- a chamber in which the first portion of the process water supply mixes with the biogas to remove the carbon dioxide from the biogas and to generate a carbon dioxide water stream, and
- an output providing the carbon dioxide water stream;

a water reservoir, the water reservoir further comprising:
- a first input to receive a second portion of the process water supply,
- a second input to receive the carbon dioxide water stream, and
- a sensor configured to generate a signal corresponding to a pH level in the water reservoir; and
- a flow control device to control injection of the carbon dioxide water stream into the water reservoir.

14. The water treatment system of claim 13, wherein the carbon dioxide separation system is selected from a group consisting of a water wash process, chemical absorption, pressure swing absorption, and membrane separation.

15. The water treatment system of claim 13, wherein the process water supply is generated by at least one other step in the water treatment system.

16. The water treatment system of claim 13, further comprising a controller configured to receive the signal from the sensor and to control operation of the flow control device for injection of the carbon dioxide water stream into the water reservoir as a function of the signal.

17. The water treatment system of claim 13, further comprising a second water reservoir, wherein the process water supply is output from the second water reservoir.

* * * * *